United States Patent
Al Sayeed et al.

(10) Patent No.: US 11,632,171 B2
(45) Date of Patent: *Apr. 18, 2023

(54) SYSTEMS AND METHODS FOR ACHIEVING BEST EFFORT HOME ROUTE CAPACITY ON PROTECTION PATHS DURING OPTICAL RESTORATION

(71) Applicant: Ciena Corporation, Hanover, MD (US)

(72) Inventors: Choudhury A. Al Sayeed, Stittsville (CA); David Atkinson, Ottawa (CA); Marc De La Durantaye, Ottawa (CA); David W. Boertjes, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/294,061

(22) PCT Filed: Oct. 11, 2019

(86) PCT No.: PCT/US2019/055858
§ 371 (c)(1),
(2) Date: May 14, 2021

(87) PCT Pub. No.: WO2020/112258
PCT Pub. Date: Jun. 4, 2020

(65) Prior Publication Data
US 2022/0029702 A1    Jan. 27, 2022

Related U.S. Application Data

(63) Continuation of application No. 16/201,316, filed on Nov. 27, 2018, now Pat. No. 10,587,339.

(51) Int. Cl.
*H04B 10/032* (2013.01)
*H04B 10/70* (2013.01)
*H04Q 11/00* (2006.01)

(52) U.S. Cl.
CPC ........... *H04B 10/032* (2013.01); *H04B 10/70* (2013.01); *H04Q 2011/0081* (2013.01)

(58) Field of Classification Search
None
See application file for complete search history.

(56) References Cited

U.S. PATENT DOCUMENTS

| 5,363,408 A | 11/1994 | Paik et al. |
| 5,541,955 A | 7/1996 | Jacobsmeyer |

(Continued)

FOREIGN PATENT DOCUMENTS

| EP | 2403169 B1 | 1/2013 |
| WO | 2011051442 A9 | 9/2011 |

OTHER PUBLICATIONS

Jinno, Masahiko et al., "Concept and Enabling Technologies of Spectrum-Sliced Elastic Optical Path Network (SLICE)," NTT Network Innovation Laboratories, NTT Corporation, 2009, pp. 1-2.

(Continued)

*Primary Examiner* — Li Liu
(74) *Attorney, Agent, or Firm* — Baratta Law PLLC; Lawrence A. Baratta, Jr.

(57) ABSTRACT

Systems and methods of optical restoration include, with a photonic service (14), in an optical network (10, 100), operating between two nodes (A, Z) via an associated optical modem (40) at each node, wherein each modem (40) is capable of supporting variable capacity, $C_1, C_2, \ldots, C_N$ where $C_1 > C_2 > \ldots > C_N$, detecting a fault (16) on a home route of the photonic service (14) while the photonic service (14) operates at a home route capacity $C_H$, $C_H$ is one of $C_1, C_2, \ldots, C_{N-1}$; downshifting the photonic service (14) to a restoration route capacity $C_R$, $C_R$ is one of $C_2, C_3, \ldots, C_N$ and $C_R < C_H$; switching the photonic service (14) from the home route to a restoration route (18) while the photonic service (14) operates at a restoration route capacity $C_R$; and (Continued)

monitoring the photonic service (14) and copropagating photonic services during operation on the restoration route (18) at the restoration route capacity $C_R$ for an upshift of the photonic service (14).

20 Claims, 11 Drawing Sheets

(56) References Cited

U.S. PATENT DOCUMENTS

| | | |
|---|---|---|
| 5,764,699 A | 6/1998 | Needham et al. |
| 5,808,760 A | 9/1998 | Gfeller |
| 5,909,469 A | 6/1999 | Frodigh et al. |
| 5,946,104 A | 8/1999 | Yoshida |
| 6,433,904 B1 | 8/2002 | Swanson et al. |
| 6,459,832 B1 | 10/2002 | Smith et al. |
| 6,496,297 B1 | 12/2002 | Frankel et al. |
| 6,763,195 B1 | 7/2004 | Willebrand et al. |
| 6,795,394 B1 | 9/2004 | Swinkels et al. |
| 6,829,251 B2 | 12/2004 | Duvaut et al. |
| 6,885,820 B2 | 4/2005 | Eder et al. |
| 6,904,082 B2 | 6/2005 | Jones |
| 6,904,462 B1 | 6/2005 | Sinha et al. |
| 7,016,296 B2 | 3/2006 | Hartman |
| 7,020,073 B2 | 3/2006 | Kadoua et al. |
| 7,099,597 B2 | 8/2006 | Saunders et al. |
| 7,308,052 B2 | 12/2007 | Cheng et al. |
| 7,336,902 B1 | 2/2008 | Gerszberg et al. |
| 7,391,728 B2 | 6/2008 | Natarajan et al. |
| 7,415,208 B1 | 8/2008 | Haggans et al. |
| 7,474,903 B2 | 1/2009 | Kim et al. |
| 7,542,514 B2 | 6/2009 | Song et al. |
| 7,574,134 B2 | 8/2009 | Frankel |
| 7,602,814 B2 | 10/2009 | Meagher et al. |
| 7,609,757 B2 | 10/2009 | Jones |
| 7,634,194 B2 | 12/2009 | Frankel et al. |
| 7,764,707 B2 | 7/2010 | Li |
| 7,792,044 B2 | 9/2010 | Holness et al. |
| 7,817,656 B1 | 10/2010 | Deng et al. |
| 7,826,752 B1 | 11/2010 | Zanoni et al. |
| 7,894,721 B2 | 2/2011 | Roberts et al. |
| 7,899,340 B1 | 3/2011 | Bontu et al. |
| 7,962,049 B2 | 6/2011 | Mateosky et al. |
| 7,986,878 B2 | 7/2011 | Saunders et al. |
| 8,005,375 B2 | 8/2011 | Frankel |
| 8,009,692 B2 | 8/2011 | Basso et al. |
| 8,009,985 B1 | 8/2011 | Roberts et al. |
| 8,023,396 B2 | 9/2011 | Hartman |
| 8,045,855 B2 | 10/2011 | Frankel |
| 8,139,485 B2 | 3/2012 | Arseneault et al. |
| 8,259,861 B2 | 9/2012 | Kuhtz |
| 8,295,175 B2 | 10/2012 | Ellis et al. |
| 8,364,036 B2 | 1/2013 | Boertjes et al. |
| 8,402,121 B2 | 3/2013 | Skalecki et al. |
| 8,433,192 B2 | 4/2013 | Frankel et al. |
| 8,467,687 B2 | 6/2013 | Sasaki et al. |
| 8,509,621 B2 | 8/2013 | Boertjes et al. |
| 8,526,828 B2 | 9/2013 | Nakashima et al. |
| 8,532,498 B2 | 9/2013 | Shpantzer |
| 8,553,551 B2 | 10/2013 | Spector |
| 8,553,707 B2 | 10/2013 | Swinkels et al. |
| 8,624,762 B2 | 1/2014 | Rival et al. |
| 8,625,997 B2 | 1/2014 | Evans et al. |
| 8,625,998 B2 | 1/2014 | Roberts et al. |
| 8,707,137 B2 | 4/2014 | Arye |
| 8,750,722 B2 | 6/2014 | Dangui et al. |
| 10,050,737 B1 | 8/2018 | Al Sayeed et al. |
| 10,587,339 B1* | 3/2020 | Al Sayeed ............. H04L 45/22 |
| 2002/0080445 A1 | 6/2002 | Falkenstein et al. |
| 2002/0159121 A1 | 10/2002 | Spickermann |
| 2002/0181036 A1 | 12/2002 | Achour et al. |
| 2002/0186432 A1 | 12/2002 | Roorda et al. |
| 2003/0091004 A1 | 5/2003 | Tang |
| 2003/0219253 A1 | 11/2003 | Kukshya et al. |
| 2003/0231706 A1 | 12/2003 | Hwang |
| 2003/0231887 A1 | 12/2003 | Grassi et al. |
| 2004/0156644 A1 | 8/2004 | Yasue et al. |
| 2004/0184398 A1 | 9/2004 | Walton et al. |
| 2004/0184810 A1 | 9/2004 | Spilman et al. |
| 2004/0247314 A1 | 12/2004 | Kawarai |
| 2005/0036444 A1 | 2/2005 | Park et al. |
| 2005/0047517 A1 | 3/2005 | Georgios et al. |
| 2006/0029398 A1 | 2/2006 | Liu et al. |
| 2006/0129525 A1 | 6/2006 | Rijpkema |
| 2007/0110002 A1 | 5/2007 | Yang |
| 2007/0166032 A1 | 7/2007 | Frankel |
| 2007/0230594 A1 | 10/2007 | Mo et al. |
| 2007/0253388 A1 | 11/2007 | Pietraski |
| 2007/0268814 A1 | 11/2007 | Li |
| 2008/0008469 A1* | 1/2008 | Yokoyama ......... H04B 10/0775 398/16 |
| 2008/0025728 A1 | 1/2008 | Shpantzer et al. |
| 2008/0037982 A1 | 2/2008 | Nivens-Jenkins et al. |
| 2008/0225381 A1 | 9/2008 | Heffner et al. |
| 2009/0003301 A1 | 1/2009 | Reial et al. |
| 2009/0022497 A1 | 1/2009 | Mateosky et al. |
| 2009/0103931 A1 | 4/2009 | Grigoryan et al. |
| 2009/0147896 A1 | 6/2009 | Frankel et al. |
| 2009/0168922 A1 | 7/2009 | Malladi et al. |
| 2009/0169204 A1 | 7/2009 | Meagher et al. |
| 2009/0169208 A1 | 7/2009 | Grigoryan et al. |
| 2009/0169217 A1 | 7/2009 | Meagher et al. |
| 2009/0196598 A1 | 8/2009 | Duan et al. |
| 2009/0196602 A1 | 8/2009 | Saunders et al. |
| 2009/0205007 A1 | 8/2009 | Woodward |
| 2009/0214212 A1 | 8/2009 | Vorbeck et al. |
| 2009/0285574 A1 | 11/2009 | Liu |
| 2010/0008617 A1 | 1/2010 | Marrakchi El Fellah et al. |
| 2010/0014500 A1 | 1/2010 | Lee |
| 2010/0021166 A1 | 1/2010 | Way |
| 2010/0054144 A1 | 3/2010 | Choi et al. |
| 2010/0142943 A1 | 6/2010 | Frankel et al. |
| 2010/0158531 A1 | 6/2010 | Chung et al. |
| 2010/0329686 A1 | 12/2010 | Frankel |
| 2011/0013911 A1 | 1/2011 | Alexander et al. |
| 2011/0033195 A1 | 2/2011 | Frankel |
| 2011/0122787 A1 | 5/2011 | Wang |
| 2011/0176815 A1 | 7/2011 | Frankel et al. |
| 2011/0222394 A1 | 9/2011 | Swinkels et al. |
| 2011/0222846 A1 | 9/2011 | Boertjes et al. |
| 2011/0222854 A1 | 9/2011 | Roberts et al. |
| 2011/0229149 A1 | 9/2011 | Grubb et al. |
| 2011/0255870 A1 | 10/2011 | Grigoryan et al. |
| 2012/0163820 A1 | 6/2012 | Dangui et al. |
| 2012/0201130 A1 | 8/2012 | Liu et al. |
| 2012/0219288 A1 | 8/2012 | Roberts et al. |
| 2012/0219293 A1 | 8/2012 | Boertjes et al. |
| 2012/0328296 A1 | 12/2012 | Sullivan et al. |
| 2013/0177306 A1 | 7/2013 | Pfau |
| 2013/0209089 A1 | 8/2013 | Harley et al. |
| 2013/0209091 A1 | 8/2013 | Mateosky et al. |
| 2013/0216232 A1 | 8/2013 | Zanoni et al. |
| 2013/0230316 A1* | 9/2013 | Hussain ............. H04J 14/0272 398/34 |
| 2013/0236169 A1 | 9/2013 | Gaudette et al. |
| 2013/0272318 A1 | 10/2013 | Swinkels et al. |
| 2013/0272710 A1 | 10/2013 | Wang et al. |
| 2013/0308948 A1 | 11/2013 | Swinkels et al. |
| 2013/0336649 A1 | 12/2013 | Essiambre et al. |
| 2014/0186020 A1 | 7/2014 | Handelman et al. |
| 2014/0205296 A1 | 7/2014 | Dahlfort et al. |
| 2015/0043904 A1* | 2/2015 | Boduch ............. H04B 10/038 398/2 |
| 2015/0229404 A1 | 8/2015 | Boertjes |
| 2015/0229424 A1 | 8/2015 | Moynihan et al. |
| 2016/0050470 A1* | 2/2016 | Swinkels ........... H04L 41/0896 398/45 |
| 2017/0279526 A1* | 9/2017 | Bownass ............. H04J 14/02 |
| 2017/0302372 A1* | 10/2017 | Yamauchi ............ H04J 14/02 |

OTHER PUBLICATIONS

Takara, H. et al., "Spectrally-efficient elastic optical path networks," NTT Network Innovation Laboratories, NTT Corporation, Jul. 2010, pp. 1-2.

(56) References Cited

OTHER PUBLICATIONS

Gerstel, Ori et al, "Elastic OS20.ptical Networking: A New Dawn for the Optical Layer," IEEE Communications Magazine, Feb. 2012, pp. S12-S20.

Christodoulopoulos, Kontantinos, "Elastic Bandwidth Allocation in Flexible OFDM-Based Optical Networks (Invited Paper)," Computer Engineering and Informatics Department, University of Patras, and Research Academic Computer Technology Institute, 2012, pp. 491-500.

Takagi, T. et al., "Dynamic Routing and Frequency Slot Assignment for Elastic Optical Path Networks that Adopt Distance Adaptive Modulation," NTT Network Innovation Laboratories, NTT Corporation, 2011, pp. 1-3.

Zhang, Guoying et al., "A Survey on OFDM-Based Elastic Core Optical Networking," Nov. 2011, pp. 1-48.

Liu, Lei et al., "OpenSlice: an OpenFlow-based control plane for spectrum sliced elastic optical path networks," 1KDDI R&D Laboratories Inc., Feb. 2013, pp. 1-11.

Zhang, Yi et al., "Traffic Grooming in Spectrum-Elastic Optical Path Networks," Tsinghua National Laboratory for Information Science and Technology Department of Electronic Engineering, Tsinghua University, 2011, pp. 1-3.

Ives, David J. et al., "Adapting Transmitter Power and Modulation Format to Improve Optical Network Performance Utilizing the Gaussian Noise Model of Nonlinear Impairments," Journal of Lightwave Technology, vol. 32, No. 21, Nov. 2014, pp. 3485-3494.

Collings, Brandon, New Devices Enabling Software-Defined Optical Networks, New Paradigms In Optical Communications and Networks, pp. 1-6.

Roberts, Ian, Discrete Rate Capacity Maximization, Sep. 4, 2016, pp. 1-6.

Gringeri et al., Extending Software Defined Network Principles to Include Optical Transport, New Paradigms in Optical Communications and Networks, pp. 1-9.

Roberts et al., Convex Channel Power Optimization in Nonlinear WDM Systems Using Gaussian Noise Model, Journal of Lightwave Technology, vol. 34, No. 13, Jul. 1, 2016, pp. 3212-3222.

Oliveira et al., Towards Software Defined Autonomic Terabit Optical Networks, OFC 2014, OSA 2014, pp. 1-3.

Roberts et al., Channel Power Optimization of WDM Systems Following Gaussian Noise Nonlinearity Model in Presence of Stimulated Raman Scattering, pp. 1-11.

Teipen et al., Flexible Bandwidth and Bit-Rate Programmability in Future Optical Networks, ICTON 2012, Tu.C2.1, 2012 IEEE, pp. 1-4.

Zhao et al., The Prospect of Inter-Data-Center Optical Networks, Optical Technologies For Data Center Networks, IEEE Communications Magazine, Sep. 2013, pp. 32-38.

Ciena Corporation, "Enabling a Bigger and Smarter Network With Ciena's Wavelogic 3", Application Note, AN085 Aug. 2013.

Gho et al., "Rate-Adaptive Coding for Optical Fiber Transmission Systems," IEEE Journal of Lightwave Technology, vol. 29, No. 2, Jan. 15, 2011.

Shafik et al, "On the Extended Relationships Among EVM, BER and SNR as Performance Metrics," Dec. 2006, ICECE, pp. 408-411.

Moosavi et al, "A Fast Scheme for Blind Identification of Channel Codes," Dec. 2011, IEEE, pp. 1-5.

Dec. 9, 2019, International Search Report and Written Opinion for International Patent Application No. PCT/US2019/055858.

* cited by examiner

SYSTEMS AND METHODS FOR ACHIEVING BEST EFFORT HOME ROUTE CAPACITY ON PROTECTION PATHS DURING OPTICAL RESTORATION

FIELD OF THE DISCLOSURE

The present disclosure generally relates to optical networking. More particularly, the present disclosure relates to systems and methods for achieving best effort home route capacity on protection paths during optical restoration.

BACKGROUND OF THE DISCLOSURE

Optical (photonic) networks and the like (e.g., Dense Wavelength Division Multiplexed (DWDM)) are deploying control plane systems and methods. Control planes provide automatic allocation and management of network resources in an end-to-end manner. Example control planes may include Automatically Switched Optical Network (ASON) as defined in ITU-T G.8080/Y.1304, Architecture for the automatically switched optical network (ASON) (02/2005), the contents of which are herein incorporated by reference; Generalized Multi-Protocol Label Switching (GMPLS) Architecture as defined in IETF Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween. Control planes are configured to establish end-to-end signaled connections such as Subnetwork Connections (SNCs) in ASON or OSRP, and Label Switched Paths (LSPs) in GMPLS and MPLS.

In addition to control planes which are distributed, a centralized method of control exists with Software Defined Networking (SDN) which utilizes a centralized controller. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). Note, distributed control planes can be used in conjunction with centralized controllers in a hybrid deployment. SDN and control planes are configured to compute paths, to route/signal the SNCs/LSPs, and program the underlying hardware accordingly.

Optical (photonic) networks include various Optical Add/Drop Multiplexer (OADM) nodes interconnected by optical links which can include in-line optical amplifiers. An Optical Multiplex Section (OMS) is a network section between two OADMs where spectral loading is constant on all spans. Photonic networks use control planes, SDN, etc. to provide restoration (also referred to as protection) which is a key feature in networks where a backup (protection) path takes over for an active (working) path of a service or call when there is a failure in the active path. Conventionally, photonic services are engineered to operate an associated modulation format which provides a specific amount of bandwidth based on a plurality of factors which determine optical margin based on End of Life (EOL) conditions. With respect to restoration, responsive (or before) a fault affecting a photonic service, a protection path is determined to route the faulted photonic service.

Conventionally, the protection path is constrained to support the margin requirements of the photonic service from its home route (i.e., the originally computed path, the working path). Next-generation optical modems support adaptive bandwidth via adaptable modulation formats and baud rates. These advanced features add complexity to the protection route computation and systems and methods are needed to support unequal bandwidth rates on protection routes while a photonic service is off of its home route.

BRIEF SUMMARY OF THE DISCLOSURE

In an embodiment, a method of optical restoration includes, in an optical network with a photonic service operating between two nodes via an associated optical modem at each node, wherein each modem is capable of supporting variable capacity, $C_1, C_2, \ldots, C_N$ where $C_1 > C_2 > \ldots > C_N$, detecting a fault on a home route of the photonic service while the photonic service operates at a home route capacity $C_H$, $C_H$ is one of $C_1, C_2, \ldots, C_{N-1}$; downshifting the photonic service to a restoration route capacity $C_R$, $C_R$ is one of $C_2, C_2 \ldots, C_N$ and $C_R < C_H$; switching the photonic service from the home route to a restoration route while the photonic service operates at a restoration route capacity $C_R$; and monitoring the photonic service during operation on the restoration route at the restoration route capacity $C_R$ for an upshift.

The method can further include, responsive to a determination that the photonic service can upshift from the restoration route capacity $C_R$ on the restoration route, the determination based at least on margin of the photonic service on the restoration route, configuring the associated modems to operate at an upshifted capacity from the restoration route capacity $C_R$. The method can further include, responsive to a determination that the photonic service can upshift from the restoration route capacity $C_R$ on the restoration route, the determination based at least on margin of the photonic service on the restoration route and based on margin of all copropagating photonic services over at least a portion of the restoration route, configuring the associated modems to operate at an upshifted capacity from the restoration route capacity $C_R$.

The monitoring can include measuring Bit Error Rate (BER) of the photonic service on the restoration route to determine margin in terms of Signal-to-Noise Ratio (SNR). The SNR margin of the photonic service can be determined by considering a minimum of a time-series lower bound from all associated modems of the photonic service. The photonic service can be upshifted if the margin at the restoration route capacity $C_R$ is higher than an SNR margin to overcome a signal degrade condition at a $C_{R+1}$. The method can further include determining the restoration route utilizing path computation via one or more of a control plane, a Software Defined Networking (SDN) controller, a Network Management System (NMS), and a Path Computation Engine (PCE). The method can further include determining viable capacity on the restoration route and performing the downshifting based thereon.

The optical network can be a mesh network with a plurality of nodes interconnected by a plurality of links and with a plurality of optical sections. The restoration route can have more link budget constraints than the home route, for which the home route capacity is estimated to be not achievable in end of life. The method can further include restoring to a path with home route capacity, $C_H$ if viable capacity on the restoration route is not known in advance, and then downshifting to a next available capacity, $C_{H-1}$ if the photonic service fails to run error-free and no fault on the restoration route can be correlated with the failure to run error-free.

In another embodiment, a node in an optical network includes one or more modems configured to connect to the optical network and to provide a photonic service with a second node in the optical network, wherein each modem is capable of supporting variable capacity, $C_1, C_2, \ldots, C_N$ where $C_1 > C_2 > \ldots > C_N$; and a controller connected to the one or more modems and configured to detect or receive a fault on a home route of the photonic service while the photonic service operates at a home route capacity $C_H$, $C_H$ is one of $C_1, C_2, \ldots, C_{N-1}$, cause a downshift of the photonic service to a restoration route capacity $C_R$, $C_R$ is one of $C_2, C_2 \ldots, C_N$ and $C_R < C_H$, cause a switch of the photonic service from the home route to a restoration route while the photonic service operates at a restoration route capacity $C_R$, and monitor the photonic service during operation on the restoration route at the restoration route capacity $C_R$ for an upshift.

The controller can be further configured to determine the photonic service can upshift from the restoration route capacity $C_R$ based on margin of the photonic service on the restoration route, and, responsive to a determination that the photonic service can upshift from the restoration route capacity $C_R$ on the restoration route, configure the associated modem to operate at an upshifted capacity from the restoration route capacity $C_R$. The controller can be further configured to determine the photonic service can upshift from the restoration route capacity $C_R$ based on margin of the photonic service on the restoration route and based on margin of all copropagating photonic services over all or a portion of the restoration route; and, responsive to a determination that the photonic service can upshift from the restoration route capacity $C_R$ on the restoration route, configure the associated modem to operate at an upshifted capacity from the restoration route capacity $C_R$.

The photonic service can be monitored based on measurements of Bit Error Rate (BER) of the photonic service on the restoration route to determine margin in terms of Signal-to-Noise Ratio (SNR). The photonic service can be upshifted if the margin at the restoration route capacity $C_R$ is higher than an SNR margin to overcome a signal degrade condition at a $C_{R+1}$. The controller can be further configured to determine the restoration route utilizing path computation via one or more of a control plane, a Software Defined Networking (SDN) controller, a Network Management System (NMS), and a Path Computation Engine (PCE). The controller can be further configured to determine viable capacity on the restoration route and perform the downshift based thereon. The optical network can be a mesh network with a plurality of nodes interconnected by a plurality of links and with a plurality of optical sections.

In a further embodiment, an optical network includes a plurality of nodes; and a plurality of links interconnecting the plurality of nodes in a mesh network, wherein at least one photonic service operates between two nodes via an associated optical modem at each node, wherein each modem is capable of supporting variable capacity, $C_1, C_2, \ldots, C_N$ where $C_1 > C_2 > \ldots > C_N$, wherein, responsive to detection of a fault on a home route of the at least one photonic service while the photonic service operates at a home route capacity $C_H$, $C_H$ is one of $C_1, C_2, \ldots, C_{N-1}$, the at least one photonic service is downshifted to a restoration route capacity $C_R$, $C_R$ is one of $C_2, C_2 \ldots, C_N$ and $C_R < C_H$, and the at least one photonic service is switched from the home route to a restoration route while the photonic service operates at a restoration route capacity $C_R$, and wherein the at least one photonic service is monitored during operation on the restoration route at the restoration route capacity $C_R$ for an upshift.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for achieving home route capacity via best effort during optical restoration. The systems and methods eliminate the strong dependency on margin prediction during photonic service restoration and hence, ease off the capacity prediction requirement before switching to a restoration route in a complex mesh network environment where system dynamics are constantly evolving. Instead, the systems and methods utilize existing margins after successful restoration. In other words, the systems and methods adapt service capacity to available margins to get home route capacity in a best-effort approach in a non-service affecting way (i.e., without impacting any other co-propagating services that may already be running with low margins and/or with up-shifted capacity). The systems and methods contemplate operation in mesh optical networks where various photonic services can operate over different sections, leading to a complex environment. Instead of requiring knowledge and certainty of margins on restoration routes, the systems and methods utilize a switch first approach and then adapts capacity to the best available margin considering current spectral fill condition. This allows the services to best utilize the current available steady-state of the network conditions.

Photonic Network

Figure 1:
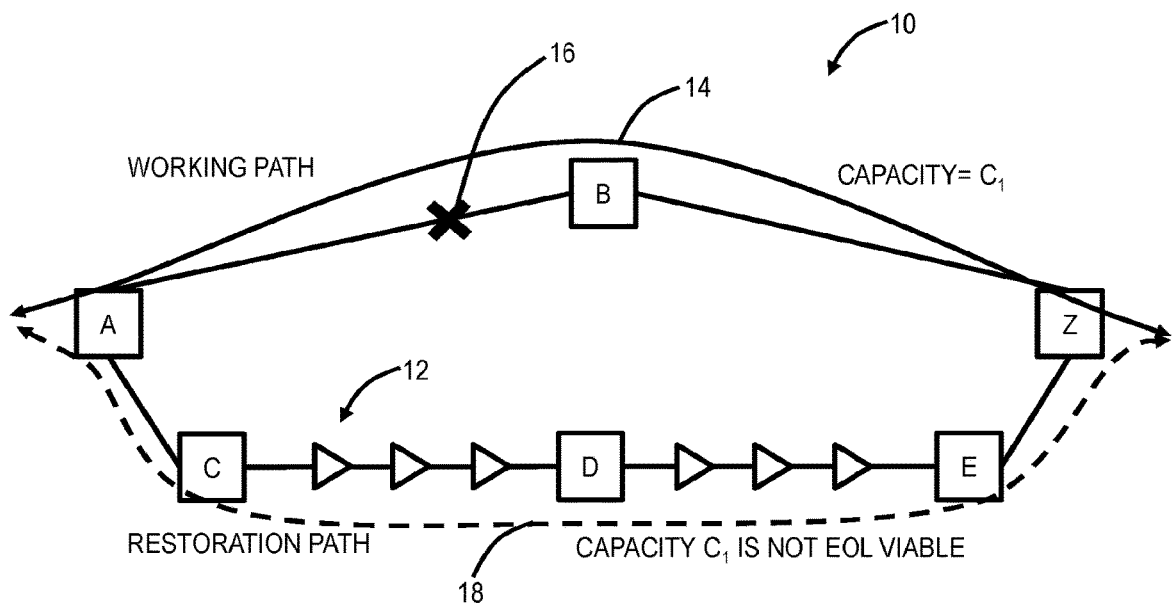
FIG. 1 is a network diagram of a photonic network with Optical Add/Drop Multiplexer (OADM) nodes A, B, C, D, E, F and intermediate amplifiers.

FIG. 1 is a network diagram of a photonic network 10 with OADM nodes A, B, C, D, E, F and intermediate amplifiers 12. The photonic network 10 can implement a control plane, be controlled by SDN, etc. The photonic network 10 includes a photonic service 14 operating on a working path (also referred to as a home route) between nodes A, B, Z with a capacity of $C_1$. The working path was computed and set for the capacity of $C_1$. The photonic service 14 is formed by modems (Tx/Rx) that are capable of supporting various capacity rates such as $C_1, C_2, \ldots, C_N$, where $C_1 > C_2 > \ldots > C_N$. Responsive to a fiber cut 16, the photonic service 14 is restored on a restoration route 18 between nodes A, C, D, E, Z, where the capacity on the home route $C_H$ (which is equal to $C_1$) will not be viable at End of Life (EOL). EOL is typically simulated for full-fill spectrum condition at all OMS (from OADM to OADM), considering statistical aging penalties from all components and fiber plants in the path, plus repair margins for all fiber spans. Note, as described herein, the terms route and path are equivalent and denote a series of links in the network 10 for a specific photonic service.

However, assumptions considered for EOL condition may not match the restoration route 18 condition, considering spectral fill, aging and repair margins per spans and so on that always leaves rooms for adding additional margins and, hence, additional capacity even though the capacity used at the home route cannot be achieved at EOL on the restoration route 18. The question is how to determine if those channels can be operated at a higher capacity than their predicted EOL rate following restoration in a dynamic mesh-environment, where spectral-fill at each OMS is evolving over time.

Figure 2:
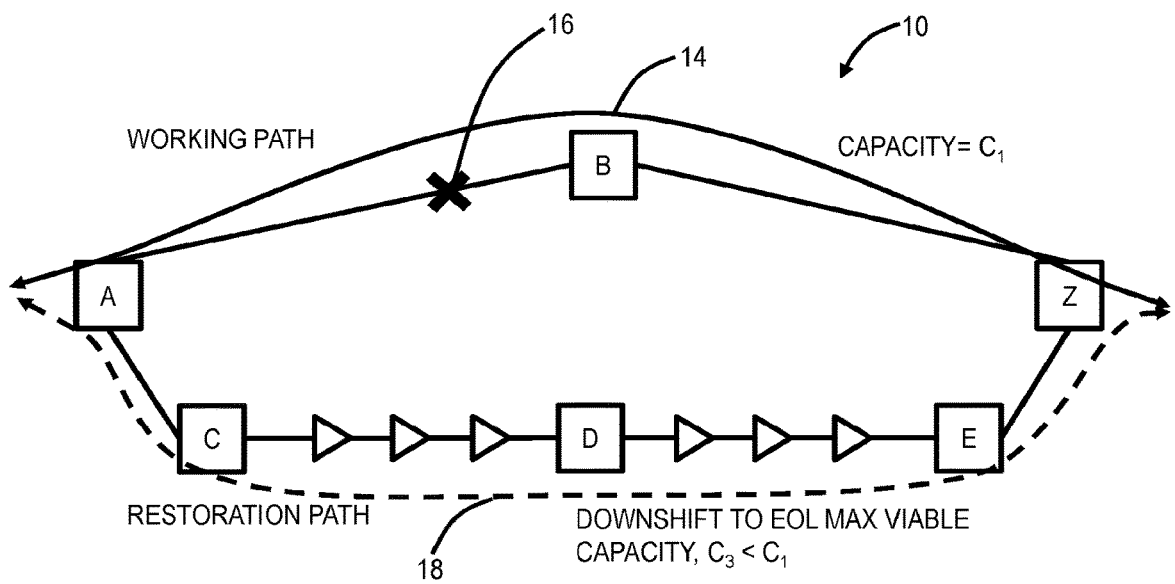
FIG. 2 is a network diagram of the photonic network of FIG. 1 with the photonic service downshifted in capacity on the protection path.

FIG. 2 is a network diagram of the photonic network 10 with the photonic service downshifted in capacity on the restoration route 18. From offline or on-line link budget estimation, the control plane or an external agent knows the available Signal-to-Noise Ratio (SNR) margin and the maximum capacity that can be viable on a path at the EOL condition (full-fill spectrum+aging penalties+repair margins). The EOL condition guarantees the viable capacity for a service for a given path based on inputs used for planning or for link budget estimation. At restoration, the EOL capacity value for the new restoration route is pushed to the modems if the EOL capacity<the home route capacity the modems were carrying. The modems switch to the EOL capacity and drop the rest based on pre-defined priority list for traffic slots. For example, if service is running at 400 Gbps capacity at the home route and the only available restoration route is capable of carrying 200 Gbps at EOL, then at restoration, modems are switched at 200 Gbps, dropping the other 200 Gbps.

The modem pairs per photonic service stay at downshifted line rate (capacity) until the home route is fixed or another path with higher line rate becomes viable. Since fixing faults in fiber plants may take days, weeks or months, which means, the modems can potentially stay at the downshifted rate for a prolonged period of time. There are approaches that can predict SNR margin for a service to a new path before it is being switched to that path only if the channel spectrum state before and after the switch remain finite. That is, the algorithm knows the current spectral fill state and knows exactly where the new services will show up in the restoration route at what power level and modulation formats after the restoration. That implies, if only the network's working and restoration routes are very much linear, and spectral states are very much known before and after a fiber fault and restoration, these approaches can predict the exact SNR margin that will be available on the restoration route at its current condition (not end-of-life), and can switch the modems to a higher than EOL line rate that can remain viable until the home-route is fixed.

Figure 3:
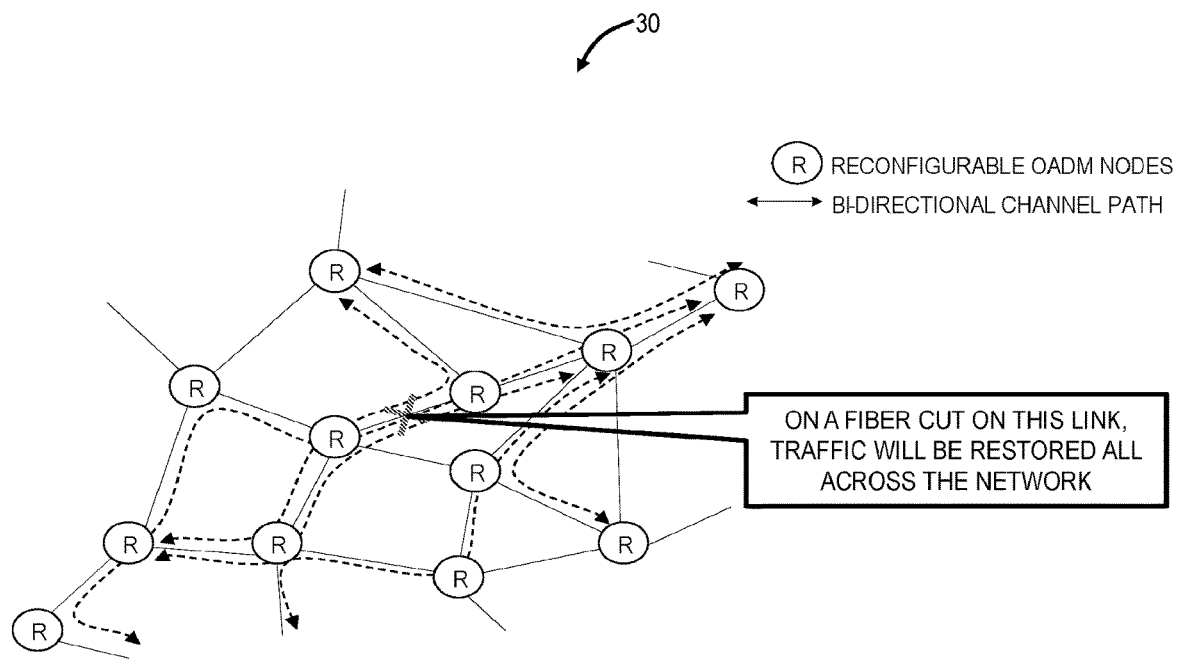
FIG. 3 is a network diagram of a portion of a mesh network.

FIG. 3 is a network diagram of a mesh network 30. In a mesh network environment, when channels will be restored to a path from different other paths in the network at a different time-scale for a single or multiple fiber cuts, it is hard to predict what the final channel population (spectral file and specific fill locations within the spectrum) will be in every OMS for a given path of interest. The problem in spectral fill prediction is already complicated in fixed grid network (where all photonic services are greater than 50 GHz and on a grid). The problem is even worse for flexible grid networks where restoring photonic services can be of different spectral widths (12.5 GHz~500 GHz).

Hence, it is hard to predict the final spectral state before restoration even takes place, and hence, most conventional approaches focus on predicting margins for full-fill spectral conditions, leaving additional margins unused for services. There are other approaches that again can simulate the network in steady-state considering no more change in current conditions and steal margins from some services and give more margins to others to up-shift them to higher capacity. Again, these approaches do not take restoration events into account, and cannot tell if enough margin will be available if the up-shifted services are restored to a different path. Hence, the challenge remains how on restoration can take advantage of available margins on the path to achieve home route capacity at best effort until the home route is fixed.

Modems

Figure 4:
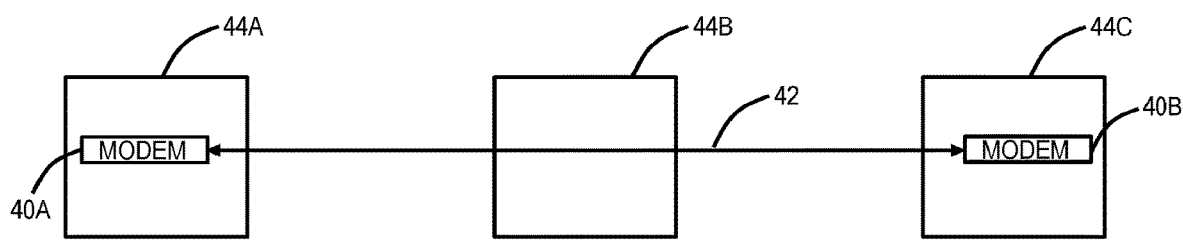
FIG. 4 is a network diagram illustrating modems forming a photonic service between OADMs.

FIG. 4 is a network diagram illustrating modems 40A, 40B forming a photonic service 42 between OADMs 44A, 44B, 44C. In this example, the OADMs 44A, 44C are add/drop locations and the OADM 44B is an express node. Each modem 40A, 40B can be tunable so that it can selectively generate a wavelength centered at the desired carrier wavelength (or frequency). The modem 40A, 40B can support multiple coherent modulation formats such as, for example, i) dual-channel, dual-polarization (DP) binary phase-shift keying (BPSK) for 100G at submarine distances, ii) DP quadrature phase-shift keying (QPSK) for 100G at ultra long-haul distances, iii) 16-quadrature amplitude modulation (QAM) for 200G at metro to regional (600 km) distances), iv) dual-channel 16QAM for 400G at metro to regional distances, v) dual-channel 64QAM for 800G at metro to regional distances. Thus, in an embodiment, the same modem 40 can support 100G to 800G. With associated digital signal processing (DSP) in the modem 40 hardware, moving from one modulation format to another is completely software-programmable.

The modem 40 can also support N-QAM modulation formats with and without dual-channel and dual-polarization where N can even be a real number and not necessarily an integer. Here, the modem 40 can support non-standard speeds since N can be a real number as opposed to an integer, i.e., not just 100G, 200G, or 400G, but variable speeds, such as 130G, 270G, 560G, etc. These rates could be integer multiples of 10 Gb/s, or of 1 Gb/s. Furthermore, with the DSP and software programming, the capacity of the flexible optical modem can be adjusted upwards or downwards in a hitless manner so as to not affect the guaranteed rate. Additionally, the modems 40 can tune and arbitrarily select spectrum; thus, no optical filters are required. Additionally, the modem 40 can support various aspects of nonlinear effect mitigation and dispersion compensation (both for chromatic and polarization mode) in the electrical domain, thus eliminating external dispersion compensation devices, filters, etc. Modems can also adapt the forward error correction coding that is used, as another method to trade-off service rate versus noise tolerance. In general, the bit rate of the service provided by a modem is proportional to the amount of spectrum occupied and is a function of the noise tolerance.

Optical Network

Figure 5:
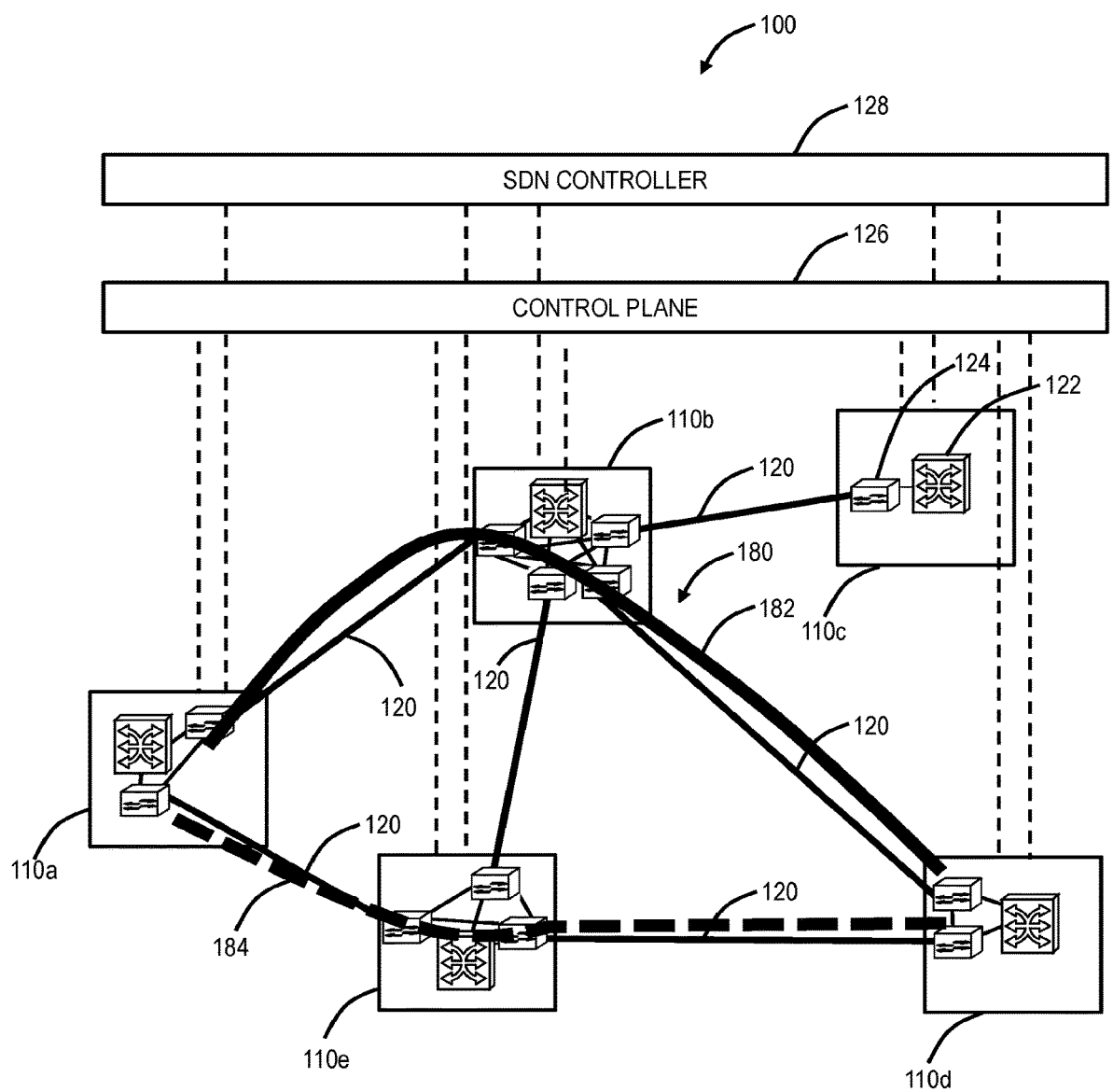
FIG. 5 is a network diagram of an example optical network with five interconnected sites.

FIG. 5 is a network diagram of an example optical network 100 with five interconnected sites 110a, 110b, 110c, 110d, 110e. The sites 110 are interconnected by a plurality of links 120. Each of the sites 110 can include a switch 122 and one or more Wavelength Division Multiplexed (WDM) network elements 124. The switch 122 is configured to provide services at Layer 0 (DWDM, photonic), Layer 1 (e.g., Optical Transport Network (OTN)), and/or Layer 2 (e.g., Ethernet). The WDM network elements 124 provide the photonic layer (i.e., Layer 0) and various functionality associated therewith (e.g., multiplexing, amplification, optical routing, wavelength conversion/regeneration, local add/drop, etc.) including photonic control. Of note, while shown separately, those of ordinary skill in the art would understand the switch 122 and the WDM network elements 124 may be realized in the same network element or each in multiple network elements. The photonic layer can also include intermediate amplifiers and/or regenerators on the links 120 which are omitted for illustration purposes. The optical network 100 is illustrated, for example, as an interconnected mesh network, and those of ordinary skill in the art will recognize the optical network 100 can include other architectures, with additional sites 110 or with fewer sites 110, with additional network elements and hardware, etc. The optical network 100 is presented herein as an example of implementing the optical restoration systems and methods.

The sites 110 communicate with one another optically over the links 120. The sites 110 can be network elements which include a plurality of ingress and egress ports forming the links 120. Further, the sites 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes 130 at each particular node 130. As described herein, the terms node and network element are interchangeable, each representing a device in the network 100. The network 100 includes a control plane 126 operating on and/or between the switches 122 and/or the WDM network elements 124 at the sites 110a, 110b, 110c, 110d, 110e. The control plane 126 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an embodiment, the control plane 126 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100 and the control plane 126 can utilize any type control plane for controlling the switches 122 and/or the WDM network elements 124 and establishing connections.

An SDN controller 128 can also be communicatively coupled to the optical network 100. SDN is a framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 128 knowing a full network topology through configuration or through the use of a controller-based discovery process in the optical network 100. The SDN controller 128 differs from a management system in that it controls the forwarding behavior of the nodes 122, 124 only, and performs control in real time or near real time, reacting to changes in services requested, network traffic analysis and network changes such as failure and degradation. Also, the SDN controller 128 provides a standard northbound interface to allow applications to access network resource information and policy-limited control over network behavior or treatment of application traffic. The SDN controller 128 sends commands to each of the nodes 122, 124 to control matching of data flows received and actions to be taken, including any manipulation of packet contents and forwarding to specified egress ports.

Example Network Element/Node

Figure 6:
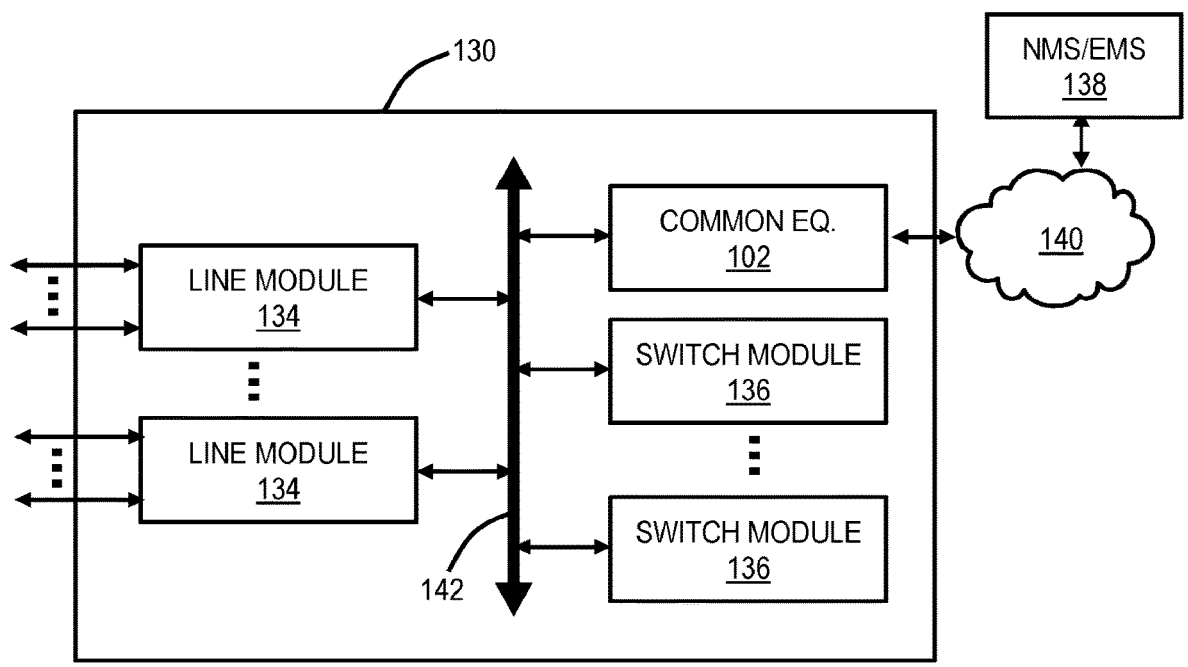
FIG. 6 is a block diagram of a node for use with the systems and methods described herein.

FIG. 6 is a block diagram of a node 130 for use with the systems and methods described herein. The node 130 can be the switch 122, the WDM network element 124, or the like. In an embodiment, the node 130 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the node 130 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 130 can be a system with ingress and egress digital signals and switching of channels, timeslots, tributary units, etc. Also, the node 130 can be a system with ingress and egress of optical signals and switching/routing of wavelengths. Of course, the node 130 can combine both digital signals and optical signals. While the node 130 is generally shown as an optical network element, the systems and methods contemplated for use with any switching fabric, network element, or control plane network based thereon, supporting Layer 0 (photonic) restoration.

The node 130 can include common equipment 132, one or more line modules 134, and one or more switch modules 136. The common equipment 132 can include power; a control module; Operations, Administration, Maintenance, and Provisioning (OAM&P) access; user interface ports; and the like. The common equipment 132 can connect to a management system 138 through a data communication network 140 (as well as a Path Computation Element (PCE), the SDN controller 128, OpenFlow controller, etc.). The management system 138 can include a Network Management System (NMS), Element Management System (EMS), or the like. Additionally, the common equipment 132 can include a control plane processor, such as a controller 150 illustrated in FIG. 7 configured to operate the control plane 126, the SDN controller 128 as described herein. The node 130 can include an interface 142 for communicatively coupling the common equipment 132, the line modules 134, and the switch modules 136 to one another. For example, the interface 142 can be a backplane, midplane, a bus, optical or electrical connectors, or the like. The line modules 134 are configured to provide ingress and egress to the switch modules 136 and to external connections on the links to/from the node 130. Other configurations and/or architectures are also contemplated.

The line modules 134 can include the optical modems 40. The line modules 134 support the photonic services which can include a protocol, such as, for example, ODUn, ODUflex, OTUCn, Flexible Ethernet, etc. Further, the line modules 134 can include a plurality of optical connections per module and each module may include a flexible rate support for any type of connection, such as, for example, 155 Mbps, 622 Mbps, 1 Gbps, 2.5 Gbps, 10 Gbps, 40 Gbps, 100 Gbps, 200 Gbps, 400 Gbps, N×1.25 Gbps, and any rate in between as well as higher rates. The line modules 134 can include wavelength division multiplexing interfaces, short reach interfaces, and the like, and can connect to other line modules 134 on remote network elements, end clients, edge routers, and the like, e.g., forming connections on the links in the network 100. From a logical perspective, the line modules 134 provide ingress and egress ports to the node 130, and each line module 134 can include one or more physical ports. The switch modules 136 are configured to switch channels, timeslots, tributary units, packets, etc. between the line modules 134. For example, the switch modules 136 can provide wavelength granularity (Layer 0 switching); OTN granularity; Ethernet granularity; and the like. Specifically, the switch modules 136 can include TDM and/or packet switching engines.

Those of ordinary skill in the art will recognize the node 130 can include other components which are omitted for illustration purposes, and that the systems and methods described herein are contemplated for use with a plurality of different network elements with the node 130 presented as an example of a type of network element. For example, in another embodiment, the node 130 may not include the switch modules 136, but rather have the corresponding functionality in the line modules 134 (or some equivalent) in a distributed fashion. For the node 130, other architectures providing ingress, egress, and switching are also contemplated for the systems and methods described herein. In general, the systems and methods described herein contemplate use with any network element providing switching of channels, timeslots, tributary units, wavelengths, etc. and using the control plane 126, the SDN controller 128, etc. Furthermore, the node 130 is merely presented as one example of node 130 for the systems and methods described herein.

Controller

Figure 7:
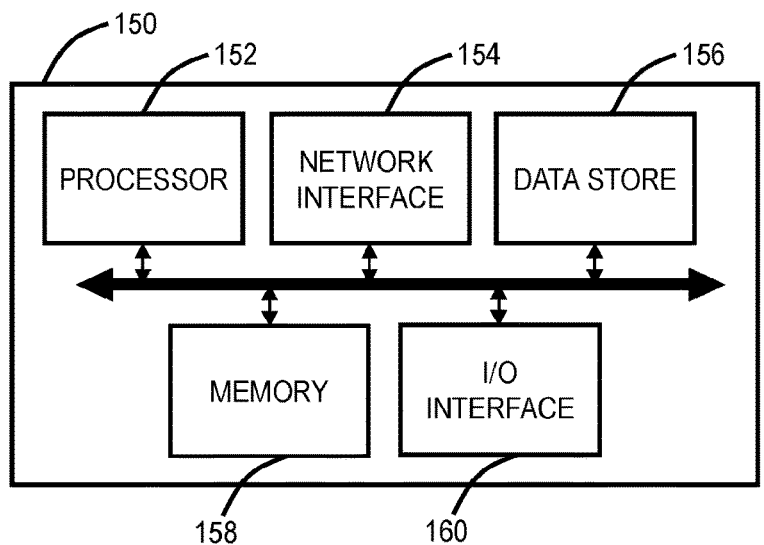
FIG. 7 is a block diagram of a controller to provide control plane processing and/or OAM&P for the node of FIG. 7.

FIG. 7 is a block diagram of a controller 150 to provide control plane processing and/or OAM&P for the node 130. The controller 150 can be part of the common equipment, such as common equipment 132 in the node 130, or a stand-alone device communicatively coupled to the node 130 via the DCN 140. The controller 150 can include a processor 152 which is a hardware device for executing software instructions such as operating the control plane. The processor 152 can be any custom made or commercially available processor, a central processing unit (CPU), an auxiliary processor among several processors associated with the controller 150, a semiconductor-based microprocessor (in the form of a microchip or chip set), or generally any device for executing software instructions. When the controller 150 is in operation, the processor 152 is configured to execute software stored within the memory, to communicate data to and from memory 158, and to generally control operations of the controller 150 pursuant to the software instructions. The controller 150 can also include a network interface 154, a data store 156, memory 158, an I/O interface 160, and the like, all of which are communicatively coupled to one another and to the processor 152.

The network interface 154 can be used to enable the controller 150 to communicate on the DCN 140, such as to communicate control plane information to other controllers, to the management system 138, to the nodes 130, and the like. The network interface 154 can include address, control, and/or data connections to enable appropriate communications on the DCN 140. The data store 156 can be used to store data, such as control plane information, provisioning data, OAM&P data, etc. The data store 156 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 156 can incorporate electronic, magnetic, optical, and/or other types of storage media. The memory 158 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 158 may incorporate electronic, magnetic, optical, and/or other types of storage media. Note that the memory 158 can have a distributed architecture, where various components are situated remotely from one another but may be accessed by the processor 152. The I/O interface 160 includes components for the controller 150 to communicate with other devices. Further, the I/O interface 160 includes components for the controller 150 to communicate with the other controllers/nodes, such as using overhead associated with TDM signals.

The controller 150 can be configured to communicate with other controllers 150 in the network 100 to operate the control plane 126 and for control plane signaling. This communication may be either in-band or out-of-band. For SONET networks and similarly for SDH networks, the controllers 150 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In the WDM network elements 124, the signaling can be via an Optical Service Channel (OSC). In an embodiment, the controllers 150 can include an in-band signaling mechanism utilizing OTN overhead. The General Communication Channels (GCC) defined by ITU-T Recommendation G.709 are in-band side channels used to carry transmission management and signaling information within Optical Transport Network elements. For example, the GCC may be used for in-band signaling or routing to carry control plane traffic. Based on the intermediate equipment's termination layer, different bytes may be used to carry control plane signaling. Other mechanisms are also contemplated for control plane signaling.

The controller 150 is configured to operate the control plane 126 in the network 100. That is, the controller 150 is configured to implement software, processes, algorithms, etc. that control configurable features of the network 100, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 150 can include a topology database that maintains the current topology of the network 100 based on control plane signaling (e.g., HELLO messages) and a connection database that maintains available bandwidth on the links 120 again based on the control plane signaling. The control plane 126 can be a distributed control plane; thus, a plurality of the controllers 150 can act together to operate the control plane 126 using the control plane signaling to maintain database synchronization. In source-based routing, the controller 150 at a source node 130 for a connection is responsible for path computation and establishing by signaling other controllers 150 in the network 100, such as through a SETUP message. Path computation generally includes determining a path, i.e., traversing the links 120 through the nodes 130 from the originating node 130 to the destination node 130 based on a plurality of constraints such as administrative weights on the links, bandwidth availability on the links 120, etc.

Upshift/Downshift Process

In various embodiments, the systems and methods provide capacity adjustments in a modem 40 when the associated photonic service is restored to a restoration route from a home route. Referring back to FIG. 5, assume there is a photonic service 180 between the site 110a, 110d with a home route 182 between the sites 110a, 110b, 110d. Further, assume there is a failure or fiber cut (e.g., on a link 120, or a failure of components in the site 110b), and there is a restoration route 184 between the sites 110a, 110e, 110d. As described herein, the home route 182 can be computed using various path computation techniques and the photonic service 180 is instantiated in the network 100 over the home route 182. At some point, the failure or fiber cut occurs, and the controller 150 associated with the site 110a (or some other component) can compute the restoration route 184 (alternatively, the restoration route 184) can be precomputed.

The foregoing flowcharts describe various processes for an upshift/downshift process to account for capacity differences (from an optical perspective) of the home route 182 and the restoration route 184. The systems and methods eliminate the strong dependency on margin prediction of the restoration route 184. As mentioned with respect to the mesh network 30, paths can be complex in the mesh network 30, and it is difficult to have an accurate representation of optical margin (prior to installing the service, after which the margin can simply be measured). The mesh network 30 has many routes and many different photonic services with different A-Z routes, leading to a complex environment where system dynamics are constantly evolving.

Instead, the systems and methods provide an approach to utilize existing margins after successful restoration. In other words, adapting the service capacity to available margins to get home route capacity in the best effort, a non-service affecting manner (i.e., without impacting any other copropagating services that may already be running with low margins and/or with upshifted capacity).

In the various flowcharts that follow, description is provided with reference to the photonic service 180 initially operating on the home route 182 which experiences a fault requiring restoration to the restoration route 184. While these processes are described with reference to a single photonic service 180, those of ordinary skill in the art will realize a practical embodiment would include multiple photonic services, each of which could be restored utilizing the systems and methods described herein. Further, those of ordinary skill in the art will recognize various steps in the upshift and downshift processes can be used in combination with one another.

Upshift Process

Figure 8:
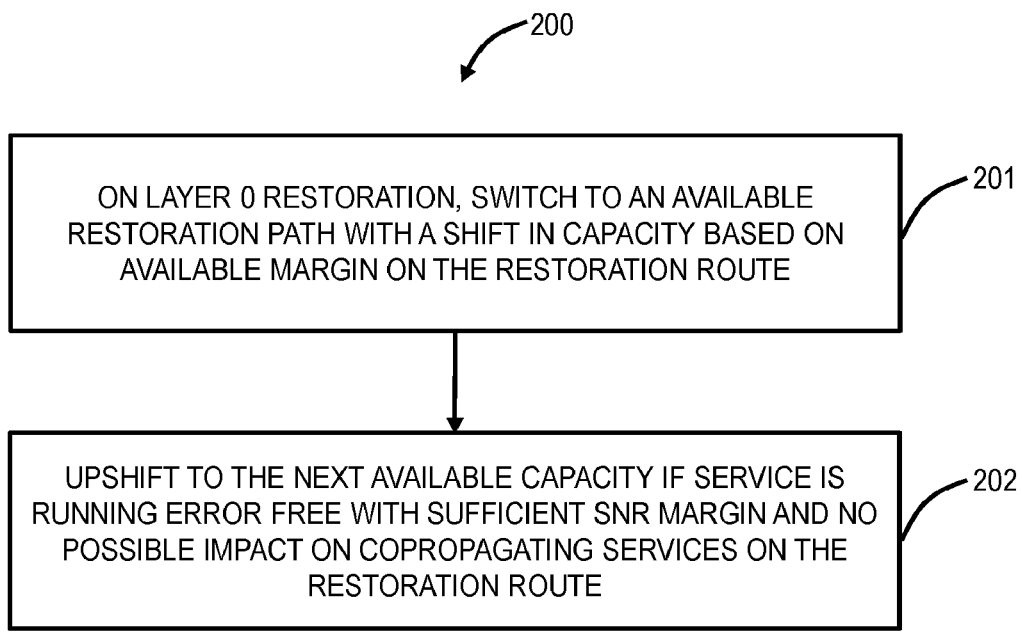
FIG. 8 is a flowchart of an upshift process for restoring a photonic service from a home route to a restoration route with some insight into margin available on the restoration route.

FIG. 8 is a flowchart of an upshift process 200 for restoring a photonic service from a home route to a restoration route with some insight into margin available on the restoration route. The upshift process 200 is performed in the network 100 after the photonic service 180 experiences a fault on the home route 182, and after the control plane 126, the SDN controller, or some other entity determines the restoration route 184. Again, this determination of the restoration route 184 can be at runtime (when the fault occurs) or any time prior. The upshift process 200 further includes some insight into the margin available on the restoration route 184. This insight can be based on measurements (e.g., via equipment at the sites 110a, 110e, 110d which monitor the associated links 120), computation (e.g., estimates based on variables such as length of the links 120, optical parameters, etc.), and/or a combination of measurements and computation. That said, the insight into the margin available can be an estimate (as is the case in the computation) or more accurate based on measurements.

The upshift process 200 includes, for a Layer 0 restoration, switching to the restoration route 184 with a shift in capacity based on the available margin on the restoration route 184 (step 201). Here, the modems 40 forming the photonic service 180 can coordinate a shift in capacity downward if the available margin on the restoration route 184 does not support the capacity of the photonic service on the home route 182. Again, the photonic service 180 is formed by modems 40 that are capable of supporting various capacity rates such as $C_1, C_2, \ldots, C_N$, where $C_1 > C_2 > \ldots > C_N$. For example, the home route 182 capacity can be $C_1$, and the restoration route 184 does not support the capacity $C_1$ based on the insight into the available margin. At step 201, the photonic service 180 is shifted in capacity to some value $C_m$ where $m=2, 3, \ldots, N$ and then the photonic service 180 is rerouted from the home route 182 to the restoration route 184. Of note, this downshift in the upshift process 200 is performed prior to rerouting.

In an embodiment, the insight into available margin on the restoration route 184 can be an estimate or offline simulated and the downshift in capacity can be based on a conservative approach, i.e., a value which is expected to work. Here, the downshift can be viewed as a "safe mode" where it is guaranteed that the photonic service 180 will operate on the restoration route 184. Note, often the restoration route 184 is longer than the home route 182, which is why the home route 182 is selected as the primary path. Here, the photonic service 180 is scaled back (downshifted) to a safe capacity prior to switching to the restoration route 184. In this manner, there is no requirement to know the exactly available margin on the restoration route 184. Rather, once the photonic service 180 is on the restoration route 184, the upshift process 200 includes upshifting to the next available capacity ($C_1, C_2, \ldots$) if the photonic service 180 is running error free with sufficient SNR margin and with no possible impact on copropagating services on the restoration route 184 (step 202). Here, the photonic service 180 operates in with the "safe" capacity on the restoration route 184 initially and then upshifts as long as the photonic service 180 is running error free with sufficient SNR margin and with no possible impact on copropagating services on the restoration route 184.

Downshift Process

Figure 9:
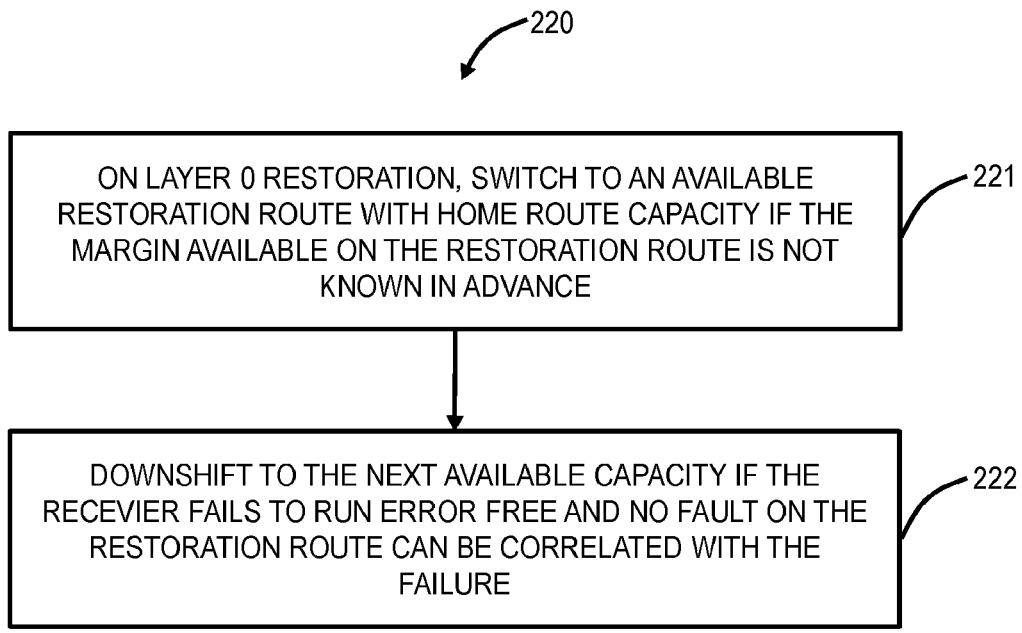
FIG. 9 is a flowchart of a downshift process for restoring a photonic service from a home route to a restoration route without insight into margin available on the restoration route.

FIG. 9 is a flowchart of a downshift process 220 for restoring a photonic service from a home route to a restoration route without insight into margin available on the restoration route. The downshift process 220 is similar to the upshift process 200, i.e., performed in the network 100 after the photonic service 180 experiences a fault on the home route 182, and after the control plane 126, the SDN controller, or some other entity determines the restoration route 184. Again, this determination of the restoration route 184 can be at runtime (when the fault occurs) or any time prior. However, the downshift process 220 does not include some insight into the margin available on the restoration route 184.

The downshift process 220, for a Layer 0 restoration, switching to the restoration route 184 with the home route capacity if the margin available on the restoration route 184 is not known in advance (step 221). Note, while the upshift process 200 can be viewed as a "safe mode" approach, the downshift process 220 simply takes the approach to move to the restoration route 184 and then downshift responsive to errors. That is, the downshift process 220 includes downshifting to the next available capacity of the modem receiver fails to run error free and there is no fault on the restoration route that can be correlated with the failure (errors) (step 222).

Combined Upshift/Downshift Process

Figure 10:
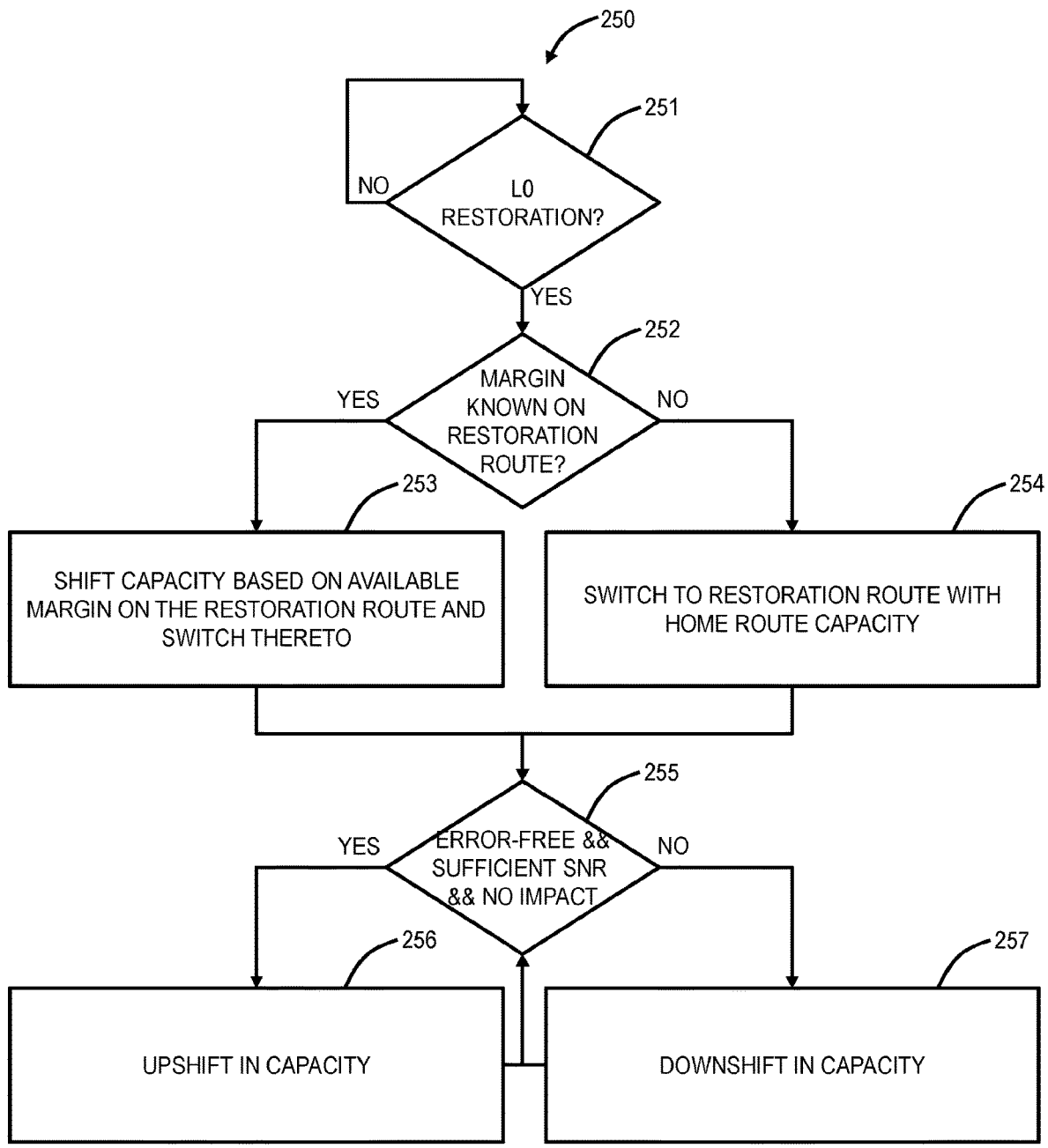
FIG. 10 is a flowchart of a process including both upshifting and downshifting of capacity when moving to a restoration route from a home route.

FIG. 10 is a flowchart of a process 250 including both upshifting and downshifting of capacity when moving to a restoration route from a home route. The process 250 combines aspects of the upshift process 200, and the downshift process 220. The process 250 is performed in the network 100 after the photonic service 180 experiences a fault on the home route 182, and after the control plane 126, the SDN controller, or some other entity determines the restoration route 184, i.e., Layer 0 (L0) restoration (step 251). Again, this determination of the restoration route 184 can be at runtime (when the fault occurs) or any time prior. The process 250 may or may not have insight into the margin available on the restoration route 184 (step 252). If the process 250 includes knowledge of the margin on the restoration route 184 (step 252), the process 250 can include shifting capacity of the photonic service 180 based on the available margin on the restoration route 184 and switching thereto (step 253). This insight into margin can be based on measurements (e.g., via equipment at the sites 110a, 110e, 110d which monitor the associated links 120), computation (e.g., estimates based on variables such as length of the links 120, optical parameters, etc.), and/or a combination of measurements and computation. That said, the insight into the margin available can be an estimate (as is the case in the computation) or more accurate based on measurements.

If the process 250 does not have knowledge of the margin on the restoration route 184 (step 252), the process 250 includes switching to the restoration route 184 with the home route 182 capacity (step 254). Once the photonic service 180 is on the restoration route 184, the process 250 includes monitoring the photonic service 180 to determine if there are any errors and what the SNR margin is and any impacts on copropagating services along with the photonic service 180 (step 255). The errors can be determined from Bit Error Rate (BER) measurements, Forward Error Correction (FEC) Performance Monitoring (PM) data, etc. The SNR margin can also be determined based on various measurements available during operation of the photonic service 180 over the restoration route 184.

Based on the results at step 255, the process 250 can include an upshift in capacity (step 256) if the photonic service 180 is error free, has sufficient SNR, and causes no impact to copropagating services or a downshift in capacity (step 257) if the photonic service 180 has any errors, has insufficient SNR, and/or causes an impact to copropagating services.

In an embodiment, the upshift and downshift in capacity can be done in discrete increments. For example, the capacity can be any of $C_1, C_2, \ldots, C_N$, where $C_1 > C_2 > \ldots > C_N$ and the downshift includes moving from $C_M$ to $C_{M-1}$, and the upshift includes moving from $C_M$ to $C_{M+1}$. Of course, the upshift can include exceeding the capacity on the home route 182. However, more likely, the objective of the upshift is to get as close as possible to the capacity on the home route 182 while on the restoration route 184. In another embodiment, the upshift and downshift in capacity can be done in analog increments.

Detailed Upshift Process

Figure 11:
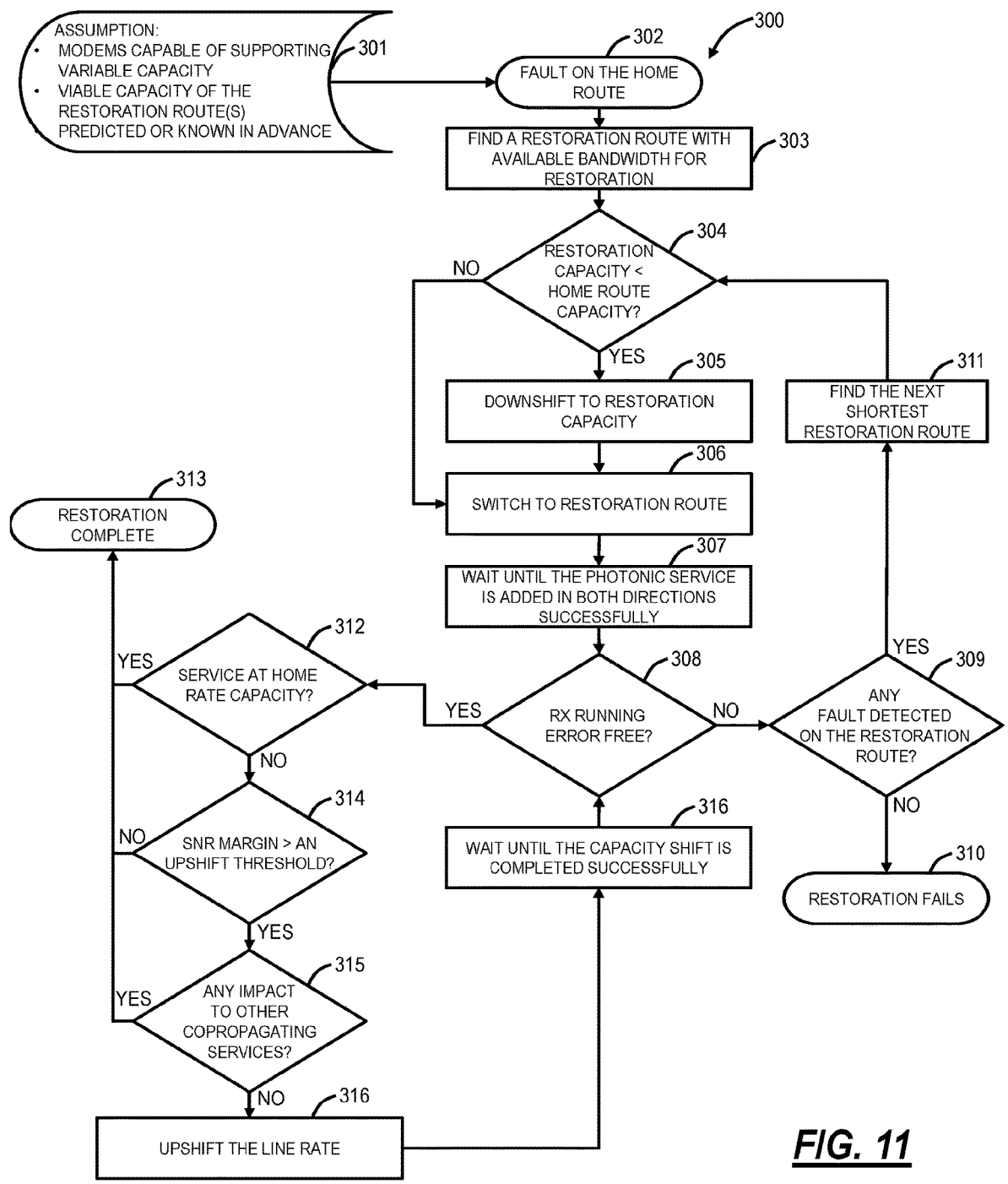
FIG. 11 is a flowchart of a detailed upshift process which provides additional details of the upshift process of FIG. 8.

FIG. 11 is a flowchart of a detailed upshift process 300 which provides additional details of the upshift process 200. The detailed upshift process 300 assumes the modems 40 for the photonic service 180 are capable of supporting variable capacity and the viable capacity of the restoration route(s) are known or predicted in advance (step 301). As described herein, viable capacity means the margin is known or predicted, and a determination can be made as to what capacity can be supported on the restoration route 184, i.e., the viable capacity.

The photonic service 180 is operating on the home route 182, and the process 300 initiates responsive to a fault on the home route 182 (step 302). A restoration route 184 is determined/found with available bandwidth for the restoration of the photonic service 180 (step 303). Again, this determination of the restoration route 184 can be at runtime (when the fault occurs) or any time prior. With respect to available bandwidth, this generally implies the photonic service 180 can support the same capacity on the restoration route 184 as on the home route 182. In an embodiment, the determined restoration route 184 can be found based on this assumption. However, in practice, there may be circumstances where it is not possible to match the capacity. As stated herein, often, one of the available restoration routes 184 may have more link budget constraints than the home route 182 which means there may be less margin. Such link budget constraints may include longer distance, impaired or degraded fiber spans, different fiber types, more OADM counts or filter penalties, penalties from optical amplifications and so on. This is also more likely in larger, complex, mesh optical networks where there are multiple photonic services and any fault causes the need for multiple restoration routes. The various systems and methods described herein provide an ability to provide best effort capacity.

The process 300 includes determining if the photonic service 180's capacity on the restoration route 184 is less than the home route capacity (step 304). As described herein, this determination is based on the viable capacity on the restoration route 184. If so, the photonic service 180 is downshifted to some restoration capacity which is less than the home route 182 capacity (step 305). If the photonic service 180's capacity on the restoration route 184 is greater than or equal to the home route capacity or after the downshift in step 305, the photonic service 180 is switched to the restoration route 184 (step 306). The process 300 includes waiting until the photonic service 180 is added successfully, in both directions (for bidirectional communication) on the restoration route 184 (step 307).

Once the photonic service 180 is operating on the restoration route 184, measurements can be determined, and it can be determined if the photonic service is operating error-free (step 308). If there are errors (step 308), the process 300 can determine if there are any faults detected on the restoration route 184 (step 309). If there are no faults on the restoration route 184, the photonic service 180 has been downshifted as much as possible, and there are still errors on the photonic service 180, then the restoration fails (step 310). Optionally, there can be another determination of an alternate restoration route. However, it is typically assumed here that the restoration route 184 was selected as being a shortest route and any alternate restoration route would be longer and thus also experience errors. If there is a fault detected on the restoration route 184 (step 309), the process 300 can include finding a next shortest available restoration route (step 311) and returning to step 304.

Back at step 308, if the photonic service 180 is operating error-free on the restoration route 184 (step 308), the process 300 includes determining if the photonic service 180 is operating currently on the restoration route 184 at the home route 182 capacity (step 312). If so, the process 300 ends as restoration is complete (step 313). If the photonic service 180 is not at the home route capacity (step 312), the process 300 includes determining if the SNR margin is greater than an upshift threshold (step 314). The upshift threshold means there is enough margin for the photonic service 180 to move to a higher capacity. If there is not enough margin (step 314), the process 300 ends as restoration is complete (step 313).

If there is enough margin (step 314), the process 300 includes checking if an upshift would impact any copropagating services (step 315). If there is an impact (step 315), the process 300 ends as restoration is complete (step 313). If there is no impact (step 315), the process 300 includes upshifting the line rate of the photonic service 180 (step 316) and waiting until the capacity shift is completed successfully (step 316) before returning to step 308.

Detailed Downshift Process

Figure 12:
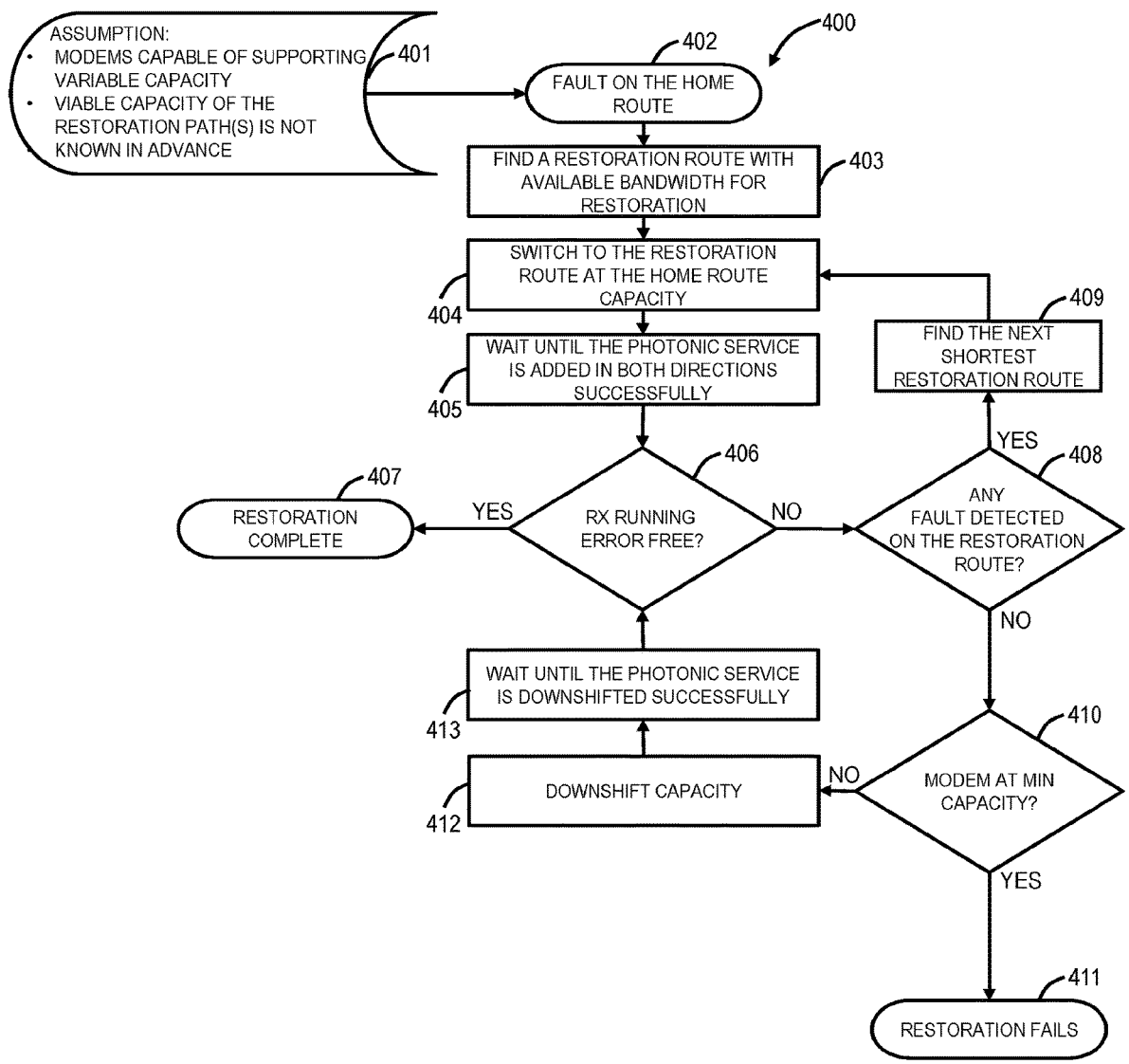
FIG. 12 is a flowchart of a detailed downshift process which provides additional details of the downshift process of FIG. 9.

FIG. 12 is a flowchart of a detailed downshift process 400 which provides additional details of the downshift process 220. The detailed downshift process 400 assumes the modems 40 for the photonic service 180 are capable of supporting variable capacity, and the viable capacity of the restoration route(s) is not known or predicted in advance (step 401). The photonic service 180 is operating on the home route 182, and the process 400 initiates responsive to a fault on the home route 182 (step 402). A restoration route 184 is determined/found with available bandwidth for the restoration of the photonic service 180 (step 403). The photonic service 180 is switched to the restoration route 184 with the home route capacity (step 404). The process 400 includes waiting until the photonic service 180 is added successfully in both directions (step 405).

At this point, measurements are determined, and it is determined if the photonic service 180 is operating error-free on the restoration route 184 (step 406). If the photonic service 180 is operating error fee (step 406), the process 400 ends as restoration is complete, i.e., the photonic service 180 is operating error-free at the home route capacity on the restoration route 184 (step 407). If the photonic service is not error-free (step 406), the process 400 includes determining if there are any faults detected on the restoration route 184 (step 408). If there are faults detected (step 408), the process 400 includes determining a next shortest restoration route (step 409) and returning to step 404.

If there are no faults (step 408), the process 400 includes determining whether the modems 40 for the photonic service 180 are at a minimum capacity (step 410). If so, the process 400 ends as the restoration fails (step 411). If the modems 40 are not at the minimum capacity (step 410), the process 400 includes downshifting the capacity of the photonic service 180 (step 412), waiting until the photonic service 180 is downshifted successfully (step 413), and returning to step 406.

Determination of an Upshift Capability

Figure 13:
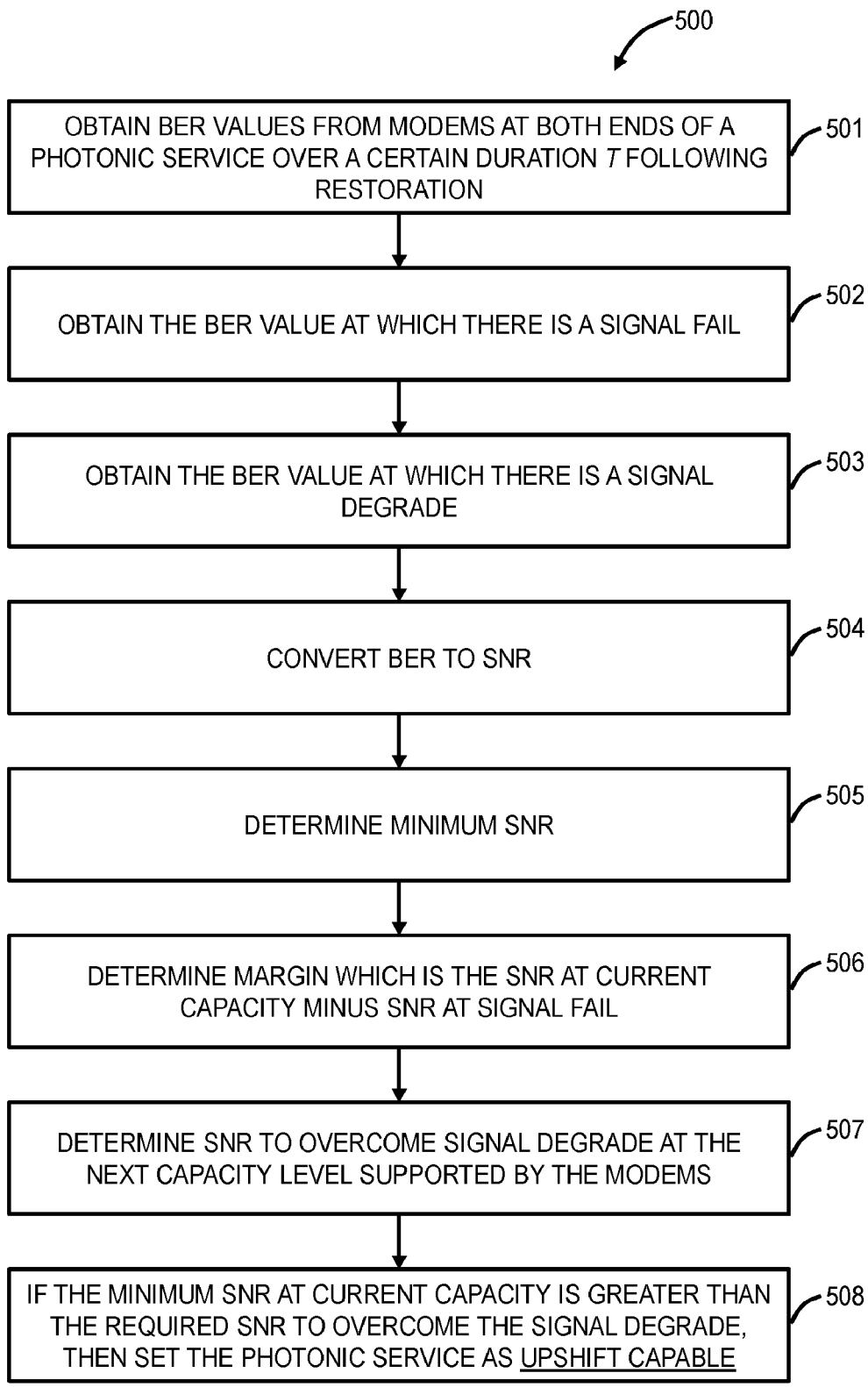
FIG. 13 is a flowchart of an upshift capability process which determines the margin and possibility of an upshift in the aforementioned processes.

FIG. 13 is a flowchart of an upshift capability process 500 which determines the margin and possibility of an upshift in the aforementioned processes. The process 500 is performed after the photonic service 180 is up and operating on the restoration route 184. The process 500 includes obtaining BER values from modems 40 at both ends of the photonic service over a certain duration T following restoration (step 501). This can be by directly measuring modem BER at both ends (modems 40) of a bidirectional photonic service 180. Note, in optical regenerator(s) are inline, then the measurement is from each of the modems 40 including ones at the optical regenerator(s).

The process 500 includes obtaining the BER value at which there is a Signal Fail (SF) (step 502). For example, the SF can be when there is a Loss of Clock at an Rx. The process 500 also includes obtaining the BER value at which there is a Signal Degrade (SD) (step 503). SD is a point at which, below, the Rx may see periodic errors.

SF is a threshold point at which the FEC can no longer converge on some frames and produces an overflow, sometimes called FEC overflow. SD is a softer threshold which can be set by the user or the system which represents the point at which the FEC is still operating properly, but the output BER is above a required threshold, e.g., $10^{-15}$ or $10^{-12}$. FEC can be viewed as a function with an input BER and an output BER, pre-FEC-BER and post-FEC-BER, respectively. The values for BER for SF and SD can be retrieved from the modem 40 since each modem 40 may have settings as calibrated during factory calibration. It is also possible that the user or other external applications may provision the SD threshold value higher than what modem, in default is capable of Regardless, the values are retrieved from the modems 40 on both ends in real-time. Signal Degrade can be set at an arbitrary additional margin threshold above a FEC overflow point.

Figure 14:
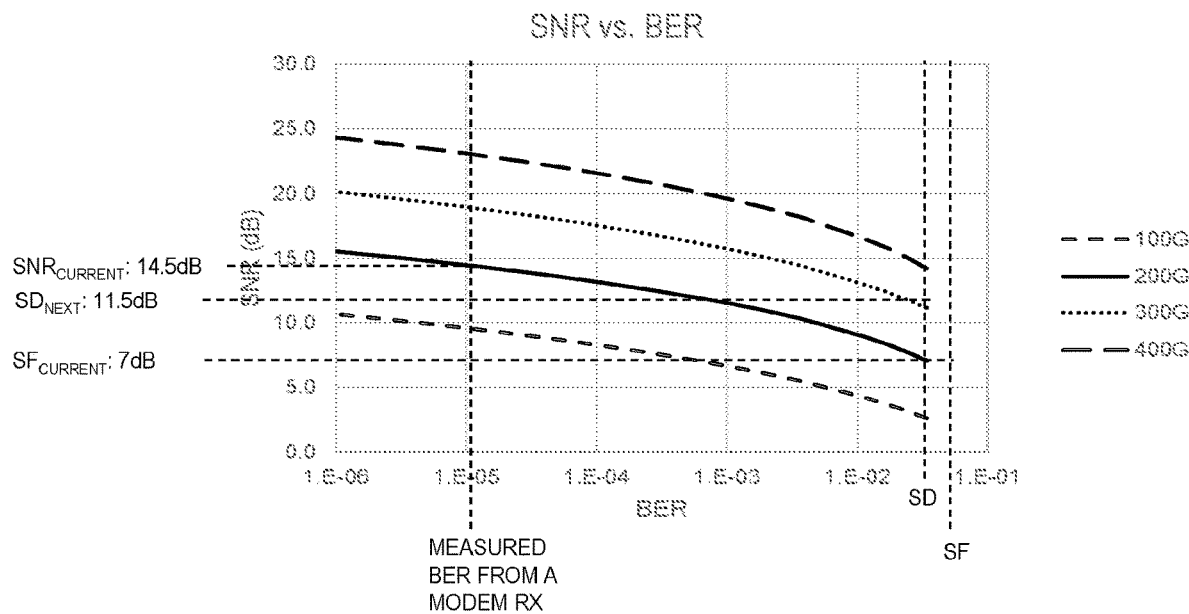
FIG. 14 is a graph of an example photonic service illustrating Signal-to-Noise (SNR) in dB versus Bit Error Rate (BER) for different capacity rates, namely 100G, 200G, 300G, 400G.

Next, the process 500 includes converting the BER values above to SNR (step 504). The BER from each modem Rx can be converted to SNR using a graph as shown for a given line rate or transmission mode (combination of line rate, modulation, and Baud rate). FIG. 14 is a graph of an example photonic service illustrating SNR in dB versus Bit Error Rate (BER) for different capacity rates, namely 100G, 200G, 300G, 400G.

The BER to SNR conversion chart can be pre-determined using factory calibrated charts with back-to-back to conversion. For example, if the measured BER for a modem Rx at 200G line rate is $10^{-5}$, then according to the graph, the measured SNR on that modem Rx will be 14.5 dB. If the pre-FEC signal fail threshold is $3.40 \times 10^{-02}$ (this is the default SF threshold for an example modem at 56GBaud 200 Gbps line rate), then the SNR at which the signal will fail, i.e., Rx will not be able to perform any more FEC correction, will be 7 dB. The difference between measured current SNR and the SNR at which signal will fail gives the SNR margin for that modem in receiving direction at the given capacity. In this case, it will be 7.5 dB SNR margin at 200G line rate.

For each bi-directional photonic service, there is at least 2×SNR margin data—one for the forward direction, and one for the reverse direction. If there are regenerators involved, then there will be 2× extra SNR margin data points available for each regenerator banks. If a photonic service is delivered using paired modems such as a 300 Gbps capacity can be delivered using 2×150 Gbps modems, where each modem is sharing a portion of the total photonic capacity, then there will be at least 2×SNR margin data points for each of those modem pairs (forward/reverse direction).

To get the minimum SNR margin for a photonic service (step 505), the SNR is tracked over time T, and a time-series lower bound can be determined using an appropriate probability of occurrence. The minimum of the time-series lower bound from each direction can provide the minimum SNR margin value for a given photonic service, which is then considered as the effective SNR margin of the photonic service and later used for checking upgrade capability.

The process 500 includes determining the margin which is the SNR at the current capacity minus the SNR at SF (step 506). The process 500 includes determining the SNR to overcome SD at the next capacity level supported by the modem (step 507). In order to check for upgrade capability, the SNR required to overcome the signal degrade threshold at the next capacity is determined. This is performed by knowing the signal degrade pre-FEC BER threshold for a modem which is the same for any given line rate or transmission mode. The SD pre-FEC BER threshold is converted to SNR using the BER to SNR conversion chart for the next available line rate. In this example (FIG. 14), it will be 11.5 dB SNR at 300 Gbps line rate for an SD pre-FEC BER threshold of $2.66 \times 10^{-02}$. Since the current SNR for the service is measured as 14.5 dB which is higher than the required SNR to overcome signal degrade condition at the next available line rate, the service will be considered upgrade capable from its current line rate or capacity of 200 Gbps to the next line rate or capacity 300 Gbps. That is, if the minimum SNR at the current capacity is greater than the required SNR to overcome SD at the next capacity level, then the photonic service 180 is upshift capable (step 508).

SNR Calculation

The modems 40 provide measurements of BER. Q has a simple relationship to BER and is further simplified by only using the one for Quadrature Phase Shift Keying (QPSK). SNR has a slightly more complicated relationship to BER. Therefore, Q has a complicated relationship with SNR. SNR has a simple relationship to margin and to capacity which is why it is more useful than Q. Q was used in the past because it is simpler to calculate than SNR and behaves similarly in many cases. Essentially, Q used to be a convenient approximation for SNR. However, Q is defined differently for each modulation format. For this reason, it is generally simplified to use the Q for QPSK for all formats.

There are also analytic formulas for conversion from SNR to pre-FEC-BER for simple formats like Binary Phase Shift Keying (BPSK), QPSK, etc. The following is the equation for QPSK.

$$preFECBER = \frac{1}{2}\text{erfc}\left(\sqrt{\frac{1}{2}SNR}\right)$$

One can use this to convert from BER to SNR using a simple numerical solver. However, for many modulation formats, there are no analytical forms (that are simple to derive), so empirical curves derived from a simulation can be used. One could use factory calibration curves as an alternative. The advantage that the simulations have over the factory calibration is that the curves can be created for a "noiseless" receiver. This means that the implementation penalty of the receiver in the field is part of the SNR that gets reported.

In the network 100, there can be an external service that monitors SNR margin. This external service can be implemented on the controller 150, on the modem 40, distributed, etc. On restoration (similar to their recovery), the processes can utilize time-varying SNR margin (i.e., average SNR over time) to decide if the service itself is upshift capable as well as paying attention to the margins of all co-propagating services, before a decision to upshift.

SNR Margins for Other Photonic Services Sharing a Path

Figure 15:
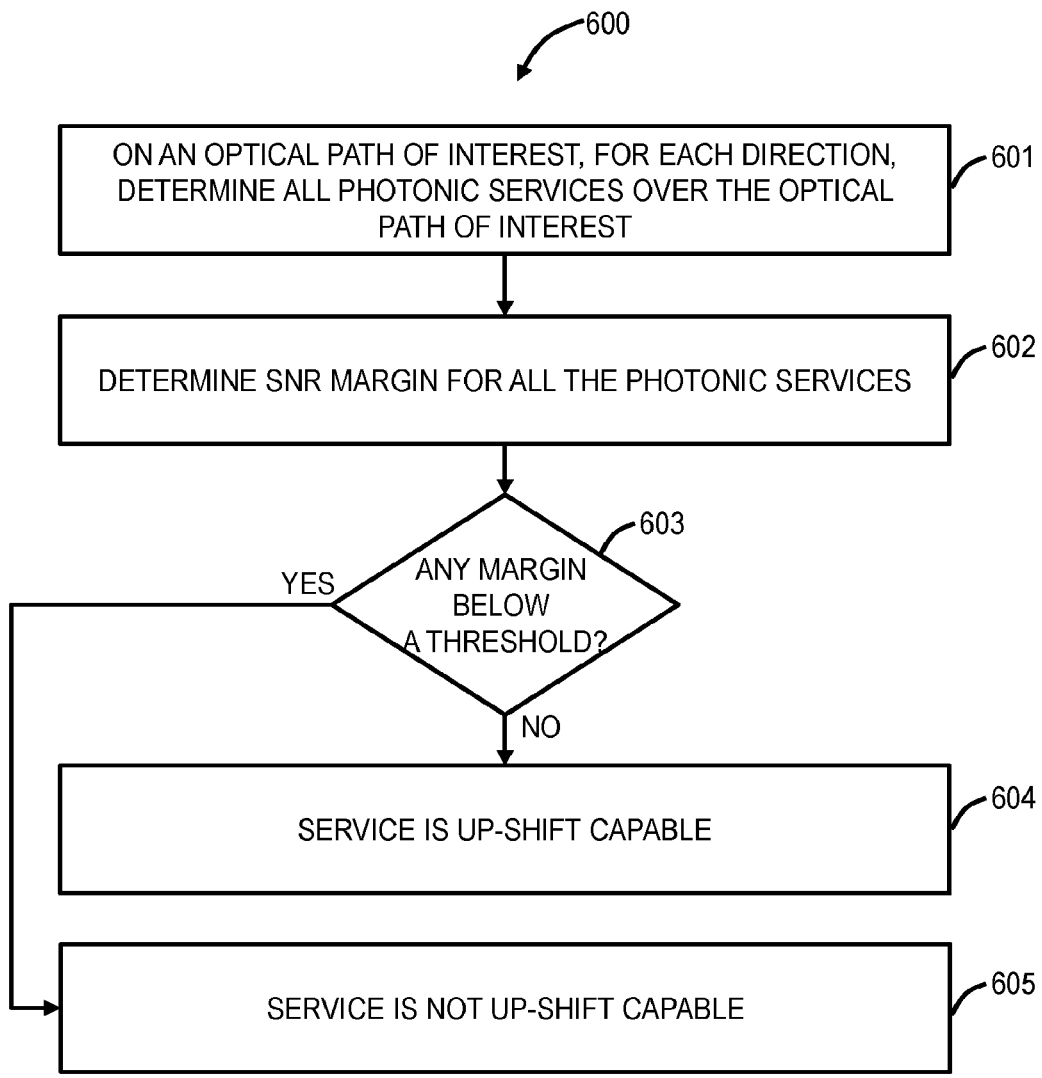
FIG. 15 is a flowchart of a process for determining SNR margins for other photonic services sharing the same path as the photonic service.

FIG. 15 is a flowchart of a process 600 for determining SNR margins for other photonic services sharing the same path as the photonic service 180. The process 600 is utilized along with the process 500 to determine upshift capability of the photonic service 180. The foregoing upshift processes avoid an upshift of the photonic service 180 if there is insufficient margin for the photonic service 180 AND if there could be an impact to other copropagating services. This second condition is implemented to avoid adverse effects on other services.

The process 600 includes, on an optical path of interest which is the restoration route 184 of the photonic service 180, for each direction (transmit and receive), determining all photonic services over the optical path of interest (step 601). This can be performed by determining all fiber spans on the optical path of interest; for each fiber span, determining all the photonic services are running through that are currently occupying the spectrum; and performing a union of the set of services running on all fiber spans that will provide the list of all other services sharing the same path.

The process 600 includes determining SNR margin for all the photonic services (step 602). This can be performed as described above with reference to the process 500. The process 500 includes determining if any of the photonic services has a margin below a pre-determined threshold (step 603). If no photonic service over the optical path of interest is below the margin threshold (step 603), the photonic service 180 is upshift capable (step 604) assuming the photonic service 180 has sufficient margin per the process 500. If one or more photonic services over the optical path of interest is below the margin threshold (step 603), the photonic service 180 is not upshift capable (step 605). Of course, this assumption in step 605 can be modified, allowing some impact, etc.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A node comprising:
   an optical modem configured to connect to an optical network and to provide a photonic service in the optical network, wherein the optical modem is capable of supporting variable capacity; and
   a controller communicatively connected to the optical modem and configured to
   detect a fault or receive notification of the fault on a current route of the photonic service while the photonic service operates at a first capacity of the variable capacity
   cause a change of the optical modem to a second capacity of the variable capacity, subsequent to the fault, wherein the optical modem is configured to switch to a restoration route while the optical modem operates at the second capacity, and
   monitor operation on the restoration route for a possible change in the second capacity and cause a change of the optical modem to a third capacity of the variable capacity based on the monitored operation, wherein the second capacity and the third capacity are based on any impact to margin of other copropagating services on the restoration route,
   wherein the possible change is based on measured margin of the photonic service and the other copropagating services.

2. The node of claim 1, wherein the photonic service is monitored based on measurements of Bit Error Rate (BER) of the photonic service on the restoration route to determine the margin in terms of Signal-to-Noise Ratio (SNR).

3. The node of claim 1, wherein the photonic service is changed if the margin is higher than margin to overcome a signal degrade condition.

4. The node of claim 1, wherein the second capacity is based on known viable capacity on the restoration route.

5. The node of claim 1, wherein the second capacity is based on predicted viable capacity on the restoration route.

6. The node of claim 1, wherein the variable capacity is configured in discrete increments.

7. The node of claim 1, wherein the impact on the other copropagating services is determined based on whether the other copropagating services are already running with low margins and are with upshifted capacity.

8. The node of claim 1, wherein the first capacity and the second capacity are different.

9. The node of claim 1, wherein the first capacity and the second capacity are the same.

10. A node comprising:
    an optical modem configured to connect to an optical network and to provide a photonic service in the optical network, wherein the optical modem is capable of supporting variable capacity; and
    a controller communicatively connected to the optical modem and configured to
    detect a fault or receive notification of the fault on a current route of the photonic service while the photonic service operates at a first capacity of the variable capacity,
    subsequent to a switch to a restoration route, monitor operation on the restoration route,
    cause a change of the optical modem to a second capacity of the variable capacity based on the monitored operation on the restoration route, and
    monitor operation on the restoration route for a possible change in the second capacity and cause a change of the optical modem to a third capacity of the variable capacity based on the monitored operation, wherein the second capacity and the third capacity are based on any impact to margin of other copropagating services on the restoration route,
    wherein the possible change is based on measured margin of the photonic service and the other copropagating services.

11. The node of claim 10, wherein the photonic service is changed is to a lower capacity when the photonic service fails to run error free on the restoration route.

12. The node of claim 10, wherein the photonic service is monitored based on measurements of Bit Error Rate (BER) of the photonic service on the restoration route to determine the margin in terms of Signal-to-Noise Ratio (SNR).

13. The node of claim 10, wherein the impact on the other copropagating services is determined based on whether the other copropagating services are already running with low margins and are with upshifted capacity.

14. A method comprising:
    detecting a fault or receive notification of the fault on a current route of a photonic service while the photonic service operates at a first capacity, wherein the photonic service is provided via an optical modem capable of supporting variable capacity;
    changing the optical modem to a second capacity of the variable capacity, subsequent to the fault;
    switching the optical modem to a restoration route while the optical modem operates at the second capacity; and
    monitoring operation on the restoration route for a possible change in the second capacity and cause a change of the optical modem to a third capacity of the variable capacity based on the monitored operation, wherein the second capacity and the third capacity are based on any impact to margin of other copropagating services on the restoration route,
    wherein the possible change in based on measured margin of the photonic service and the other copropagating services.

15. The method of claim 14, wherein the photonic service is monitored based on measurements of Bit Error Rate (BER) of the photonic service on the restoration route to determine the margin in terms of Signal-to-Noise Ratio (SNR).

16. The method of claim 15, wherein the photonic service is changed if the margin at the second capacity is higher than an SNR margin to overcome a signal degrade condition.

17. The method of claim 14, wherein the second capacity is based on known viable capacity on the restoration route.

18. The method of claim 14, wherein the second capacity is based on predicted viable capacity on the restoration route.

19. The method of claim 14, wherein the variable capacity is configured in discrete increments.

20. The method of claim 14, wherein the impact on the other copropagating services is determined based on whether the other copropagating services are already running with low margins and are with upshifted capacity.

* * * * *